United States Patent
Dewa

(10) Patent No.: US 9,584,837 B2
(45) Date of Patent: Feb. 28, 2017

(54) RECEIVING DEVICE AND METHOD OF CONTROLLING THE SAME, DISTRIBUTION DEVICE AND DISTRIBUTION METHOD, PROGRAM, AND DISTRIBUTION SYSTEM

(71) Applicant: Sony Corporation, Tokyo (JP)

(72) Inventor: Yoshiharu Dewa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 8 days.

(21) Appl. No.: 14/355,349

(22) PCT Filed: Dec. 4, 2012

(86) PCT No.: PCT/JP2012/081308
§ 371 (c)(1),
(2) Date: Apr. 30, 2014

(87) PCT Pub. No.: WO2013/088986
PCT Pub. Date: Jun. 20, 2013

(65) Prior Publication Data
US 2014/0310762 A1    Oct. 16, 2014

(30) Foreign Application Priority Data
Dec. 16, 2011    (JP) .................................. 2011-275324

(51) Int. Cl.
*H04N 21/488*    (2011.01)
*H04N 21/235*    (2011.01)
(Continued)

(52) U.S. Cl.
CPC ..... *H04N 21/235* (2013.01); *H04N 21/23614* (2013.01); *H04N 21/4884* (2013.01);
(Continued)

(58) Field of Classification Search
CPC ............ H04N 21/488; H04N 21/4882; H04N 21/4884; H04N 21/235; H04N 21/23614;
(Continued)

(56) References Cited

U.S. PATENT DOCUMENTS

2008/0152308 A1*  6/2008  Kang ..................... G11B 27/10
                                                            386/244
2012/0170643 A1*  7/2012  Soroushian .......... G11B 27/005
                                                            375/240.01
(Continued)

FOREIGN PATENT DOCUMENTS

JP    2006-238147 A    9/2006
JP    2007-067895 A    3/2007
(Continued)

OTHER PUBLICATIONS

U.S. Appl. No. 14/125,434, filed Dec. 11, 2013, Dewa.
(Continued)

*Primary Examiner* — Ricky Chin
*Assistant Examiner* — Akshay Doshi
(74) *Attorney, Agent, or Firm* — Oblon, McClelland, Maier & Neustadt, L.L.P.

(57) ABSTRACT

There is provided a receiving device including a receiving unit configured to receive a stream of a content to be distributed live, an analysis unit configured to analyze fragmented text information corresponding to subtitle data included in the received stream, and a control unit configured to control display of first text information so as to allow the display to be continued when second text information out of the text information is displayed based on a result of the analysis, the second text information being started to be displayed temporally after the first text information is displayed.

12 Claims, 19 Drawing Sheets

(51) Int. Cl.
- H04N 21/236 (2011.01)
- H04N 21/61 (2011.01)
- H04N 21/854 (2011.01)
- H04N 21/8543 (2011.01)

(52) U.S. Cl.
CPC ..... *H04N 21/6125* (2013.01); *H04N 21/8543* (2013.01); *H04N 21/85406* (2013.01)

(58) Field of Classification Search
CPC ......... H04N 21/85406; H04N 21/6125; H04N 21/8543
See application file for complete search history.

(56) References Cited

U.S. PATENT DOCUMENTS

| | | | |
|---|---|---|---|
| 2013/0076981 A1* | 3/2013 | Labrozzi | H04N 5/04 348/500 |
| 2013/0185760 A1 | 7/2013 | Yamagishi et al. | |
| 2013/0219444 A1 | 8/2013 | Kitazato et al. | |

FOREIGN PATENT DOCUMENTS

| | | |
|---|---|---|
| JP | 2009-177720 A | 8/2009 |
| JP | 2009-301605 A | 12/2009 |
| JP | 2010-219735 A | 9/2010 |
| JP | 2011-155539 A | 8/2011 |
| WO | WO 2010/087273 A1 | 8/2010 |

OTHER PUBLICATIONS

International Search Report issued Jan. 8, 2013 in PCT/JP2012/081308.

Office Action dated Aug. 29, 2016, in European Patent Application 12 857 133.8-1905 (with English-language Translation) pp. 7.

Satoshi Miyaji, ITU-T Draft Recommendation J.124 (J.mfmweb) Multifplexing Format For Multimedia Webcasting Over TCP/IP Networks, KDDI Corporation, Japan, Jan. 2004, pp. 13.

Office Action issued Nov. 8, 2016, in Japanese Patent Application No. 2013-549216 (with English translation).

* cited by examiner

FIG. 11

```
Init Instance

<tt xml:lang="" xmlns="http://www.w3.org/ns/ttml">
 <head>
  <metadata/>
  <styling xmlns:tts="http://www.w3.org/ns/ttml#styling">
  <!-- s1 specifies default color, font, and text alignment -->
  <style xml:id="s1"
     tts:color="white"
     tts:fontFamily="proportionalSansSerif"
     tts:fontSize="22px"
     tts:textAlign="center"
  />
  <!-- alternative using yellow text but otherwise the same as style s1 -->
  <style xml:id="s2" style="s1" tts:color="yellow"/>
  <!-- a style based on s1 but justified to the right -->
  <style xml:id="s1Right" style="s1" tts:textAlign="end" />
  <!-- a style based on s2 but justified to the left -->
  <style xml:id="s2Left" style="s2" tts:textAlign="start" />
  </styling>
  <layout xmlns:tts="http://www.w3.org/ns/ttml#styling">
   <region xml:id="subtitleArea1"
     style="s1"
     tts:extent="560px 62px"
     tts:padding="5px 3px"
     tts:backgroundColor="black"
     tts:displayAlign="after">
    <style tts:origin="0px 0px"/>
   </region>
  <layout xmlns:tts="http://www.w3.org/ns/ttml#styling">
   <region xml:id="subtitleArea2"
     style="s1"
     tts:extent="560px 62px"
     tts:padding="5px 3px"
     tts:backgroundColor="black"
     tts:displayAlign="after">
    <style tts:origin="0px 47px"/>
   </region>
 </head>
 <body/>
</tt>
```

```
Body Instance1

<tt>
 <body>
  <div>
   <p xml:id="subtitle1" begin="0.1s" region="subtitleArea1">
    It seems a paradox, does it not,
   </p>
  </div>
 </body>
</tt>
```

FIG. 14

Body Instance2

```
<tt>
<body>
<div>
    <p xml:id="subtitle1" end="3s" region="subtitleArea1">
    It seems a paradox, does it not,
    </p>
    <p xml:id="subtitle2" begin="1s" end="5s" region="subtitleArea2"/>
    that the image formed on<br/>
    the Retina should be inverted?
    </p>
</div>
</body>
</tt>
```

FIG. 15

It seems a paradox, does it not,

FIG. 16

It seems a paradox, does it not,
that the image formed on
the Retina should be inverted ?

FIG. 17 that the image formed on
the Retina should be inverted ?

RECEIVING DEVICE AND METHOD OF CONTROLLING THE SAME, DISTRIBUTION DEVICE AND DISTRIBUTION METHOD, PROGRAM, AND DISTRIBUTION SYSTEM

TECHNICAL FIELD

The present technology relates to a receiving device and a method of controlling the receiving device, a distribution device and a distribution method, a program, and a distribution system, and particularly to a receiving device and a method of controlling the receiving device, a distribution device and a distribution method, a program, and a distribution system that allow display of fragmented text information to be continued.

BACKGROUND ART

With the proliferation of the Internet in recent years, various services related to Internet streaming are provided such as IPTV (Internet Protocol TeleVision) for distributing videos, for example, by using IP (Internet Protocol). As a move toward standardization in Internet streaming, methods applied to VOD (Video On Demand) streaming and live streaming by HTTP (HyperText Transfer Protocol) streaming are being standardized. A MP4 file format is a highly promising format for container layers.

When subtitle data is stored as a component of a stream, a subtitle is displayed based on a file which stores the subtitle data (for example, see Patent Literature 1).

Utilizing TTML (Timed Text Markup Language), which has been standardized by W3C (World Wide Web Consortium), is becoming a standard for displaying subtitles. The TTML of the W3C is being increasingly adopted by other standardization organizations, and has received attention as a Timed Text-based promising format.

It is said that TTML is an XML (Extensible Markup Language) document, and thus it takes a relatively long time for processing. Thus, when an XML document is applied to live streaming, chunked TTML document instances, which are continuously generated as fragments in a short time, must be processed in real time, and so an idea needs to be implemented in a format or a processing system.

For this reason, at the present, it is considered that a TTML storing method for enabling real-time processing is indispensable in DASH (Dynamic Adaptive Streaming over HTTP) which is a prospective standard for an adaptive streaming format and in MP4 which is the main file format for streaming.

CITATION LIST

Patent Literature

Patent Literature 1: JP 2009-301605A

SUMMARY OF INVENTION

Technical Problem

Structurally, the TTML is divided into the following types: an initialization document instance which specifies an attribute of a layout or a style, and a body document instance which consists of character strings to be displayed. This is a specification in the TTML and is already defined as Informative Annex.

It is possible to combine TTML documents having those two types of description into a single document for distribution. However, parsing the entire XML documents by a receiving side for each distribution may cause the overhead of a processing system to increase. It is sufficient to notify the receiving side only once of attributes related to a display format such as a Style attribute and a Layout attribute of the TTML at the time of rendering context initialization. The receiving side may be notified of actual TTML text chunk (character string to be displayed) separately subsequent to a description necessary for setting a rendering context.

However, fragmented text information separately sent in this manner cannot be continued to be displayed when a subsequent fragment is acquired while the text information is on display. Particularly, in the case of live broadcast, it is not known beforehand that text information corresponding to which subtitle is to be displayed at which timing, and thus the text information currently on display cannot be continued to be displayed.

For this reason, a technical method is needed to be established which allows display of fragmented text information to be continued.

The present technology has been made in consideration of such a situation and allows display of fragmented text information to be continued.

Solution to Problem

According to a first embodiment of the present technology, there is provided a receiving device including a receiving unit configured to receive a stream of a content to be distributed live, an analysis unit configured to analyze fragmented text information corresponding to subtitle data included in the received stream, and a control unit configured to control display of first text information so as to allow the display to be continued when second text information out of the text information is displayed based on a result of the analysis, the second text information being started to be displayed temporally after the first text information is displayed.

The text information includes a structured document that describes a content, and a display definition document that defines a display format which is applied to the structured document. A time indicating start of display of the first text information is described in a first structured document that describes a content of the first text information. A time indicating end of display of the first text information and a time indicating start of display of the second text information are described in a second structured document that describes a content of the second text information. The control unit starts display of the first text information according to the time indicating the start of display of the first text information described in the first structured document, and later ends display of the first text information on display according to the time indicating the end of display of the first text information described in the second structured document, based on a result of the analysis.

The time indicating the start of display of the second text information described in the second structured document is temporally before the time indicating the end of display of the first text information, and the control unit starts display of the second text information according to the time indicating the start of display of the second text information described in the second structured document, based on a result of the analysis.

A time indicating end of display of the second text information is further described in the second structured document, and the control unit ends display of the second text information according to the time indicating the end of display of the second text information described in the second structured document, based on a result of the analysis.

The time indicating the end of display of the second text information described in the second structured document is temporally after the time indicating the end of display of the first text information.

The same display definition document is applied to the structured document until a definition content of the display format is modified.

The stream is data of a format which complies with a MP4 file format, and the subtitle data complies with a timed text markup language (TTML) standard.

A control method and a program according to a first aspect of the present technology correspond to a receiving device according to the first aspect of the above-described present technology.

In the receiving device, the control method, and the program according to the first aspect of the present technology, a stream of a content to be distributed live is received, fragmented text information corresponding to subtitle data included in the received stream is analyzed, and display of first text information is controlled so as to allow the display to be continued when second text information out of the text information is displayed based on a result of the analysis, the second text information being started to be displayed temporally after the first text information is displayed.

According to a second embodiment of the present technology, there is provided a distribution device including a content generation unit configured to generate a stream of a content for live distribution, a text information acquisition unit configured to acquire fragmented text information so as to allow display of first text information to be continued when second text information is displayed as text information corresponding to subtitle data of the content, the second text information being started to be displayed temporally after the first text information is displayed, and a distribution unit configured to distribute the stream of the content including the subtitle data on live.

A distribution method and a program according to a second aspect of the present technology correspond to a distribution device according to the second aspect of the above-described present technology.

In the distribution device, the distribution method, and the program according to the second aspect of the present technology, a stream of a content for live distribution is generated, fragmented text information is acquired so as to allow display of first text information to be continued when second text information is displayed as text information corresponding to subtitle data of the content, the second text information being started to be displayed temporally after the first text information is displayed, and the stream of the content including the subtitle data is distributed live.

According to a second embodiment of the present technology, there is provided a distribution system including a distribution device and a receiving device. The distribution device includes a content generation unit configured to generate a stream of a content for live distribution, a text information acquisition unit configured to acquire fragmented text information so as to allow display of first text information to be continued when second text information is displayed as text information corresponding to subtitle data of the content, the second text information being started to be displayed temporally after the first text information is displayed, and a distribution unit configured to distribute the stream of the content including the subtitle data on live. The receiving device includes a receiving unit configured to receive the stream of the content, an analysis unit configured to analyze the text information fragmented corresponding to the subtitle data included in the received stream, and a control unit configured to control display of the first text information so as to allow the display to be continued when the second text information out of the text information is displayed based on a result of the analysis.

The distribution device and the receiving device may be each an independent device or may be each a block included in one device.

In a distribution system according to a third aspect of the present technology, by the distribution system, a stream of a content for live distribution is generated, fragmented text information is acquired so as to allow display of first text information to be continued when second text information is displayed as text information corresponding to subtitle data of the content, the second text information being started to be displayed temporally after the first text information is displayed, and the stream of the content including the subtitle data is distributed live; and by the receiving device, the stream of the content is received, the text information fragmented corresponding to the subtitle data included in the received stream is analyzed, and display of the first text information is controlled so as to allow the display to be continued when the second text information out of the text information is displayed based on a result of the analysis.

Advantageous Effects of Invention

According to the first to third aspects of the present technology, display of fragmented text information can be continued.

BRIEF DESCRIPTION OF DRAWINGS

FIG. 11 is a figure illustrating a description example of an Initialization Document Instance.

FIG. 14 is a figure illustrating a description example of a Body Document Instance.

FIG. 15 is a figure illustrating a display example of a subtitle.

FIG. 16 is a figure illustrating a display example of a subtitle.

FIG. 17 is a figure illustrating a display example of a subtitle.

DESCRIPTION OF EMBODIMENTS

Hereinafter, an embodiment of the present technology will be described with reference to the drawings.

First, TTML will be described. The TTML is a markup language defined by the W3C and is capable of specifying a display position (layout) of a text, timing for display or the like.

For example, information described in the TTML is transmitted from a server and analyzed by a client, and a predetermined character string thereby can be displayed on a display of the client at a specified time, in a specified font, and in a specified area. Using the information described in the TTML in this manner, subtitles can be displayed in synchronization with, for example, a video or an audio in a content.

The TTML includes a set of texts each of which is called a Document Instance. The Document Instance is mainly classified into two types. One is a Document Instance called an Initialization Document Instance, which includes a description that specifies, for example, a color, a font, a display position or the like of characters to be displayed as a subtitle. The other is a Document Instance called a Body Document Instance, which includes a description of a character string or the like actually displayed as a subtitle.

In the following description, Initialization Document Instance may be abbreviated and denoted as Init Instance. Furthermore, Body Document Instance may be abbreviated and denoted as Body Instance.

[Configuration of TTML]

Figure 1:
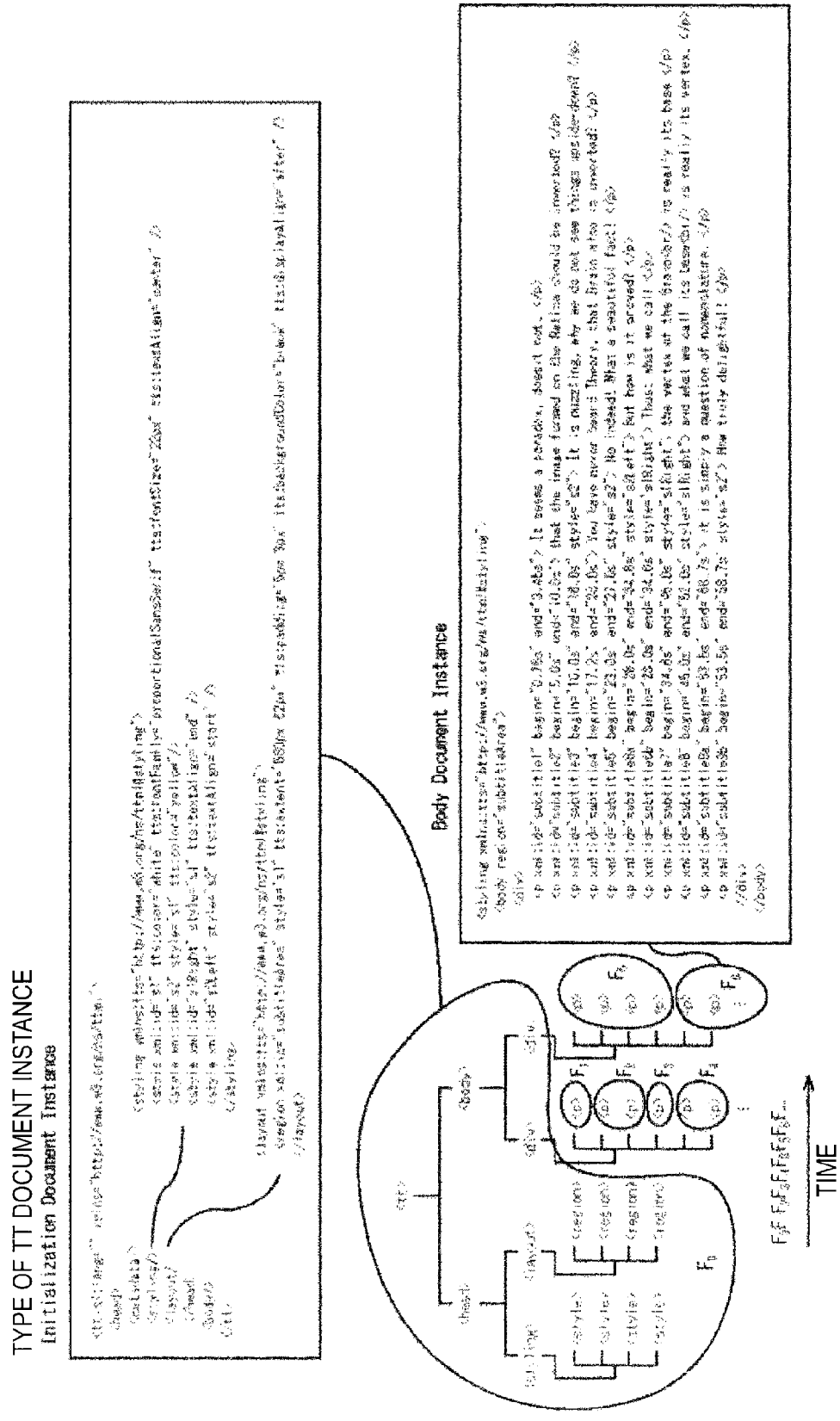
FIG. 1 is a diagram illustrating the configuration of TTML.

FIG. 1 is a diagram illustrating the configuration of TTML.

As illustrated in FIG. 1, in an Initialization Document Instance, a rendering context such as a color, a font, and a display position of characters to be displayed as a subtitle is specified by an element such as a styling element and a layout element.

In this example, a rendering context, s1 is defined by the description of "<region xml:id="subtitleArea" style="s1" . . . >" which is a layout element. For example, a plurality of types of rendering context such as s1, s2, . . . can also be defined in one Initialization Document Instance.

An element such as p-element is described in a Body Document Instance. For example, a character string in a subtitle, and attributes such as a display start time and a display end time are specified by the description of "<p xml:id= . . . >" which is p-element.

In this manner, the TTML provides a description having a hierarchical structure including a combination of Initialization Document Instance and Body Document Instance. A hierarchical structure including these instances is illustrated in a lower left area of FIG. 1.

For example, in a receiver which receives and displays a stream, predetermined text information (character string) can be displayed in a predetermined time interval in a content by causing the receiver to receive and analyze the TTML illustrated in FIG. 1. That is, the subtitle display is changed as appropriate in a display of the receiver based on the character string and attributes indicating a display start time, a display end time or the like which are specified by the p-elements of the Body Document Instance. In the example of FIG. 1, character string F1, character string F2 . . . specified by the p-elements of the Body Document Instance are displayed in a switching manner with the passage of time.

The detail of TTML is disclosed, for example, in "Timed Text Markup Language (TTML) 1.0" W3C Recommendation 18 Nov. 2010.

[Detail of MP4 File Format]

Next, a MP4 file format will be described. The MP4 file format is a file format with a high degree of flexibility, and is defined such that an MP4 file is constituted by a set of data called BOX with various sizes. BOX has various types and can be expanded arbitrarily.

Figure 2:
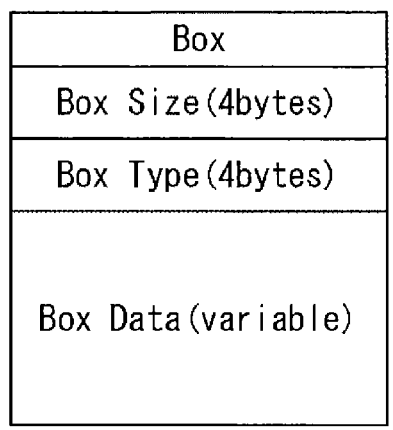
FIG. 2 is a diagram illustrating the configuration of a BOX in an MP4 file format.

The configuration of BOX in the MP4 file format is illustrated in FIG. 2. In FIG. 2, the size and type (kind) of BOX are described in the areas displayed as Box Size and Box Type. For example, video data, audio data, data of subtitles or the like, which have been encoded, are stored in the area displayed as Box Data.

Figure 3:
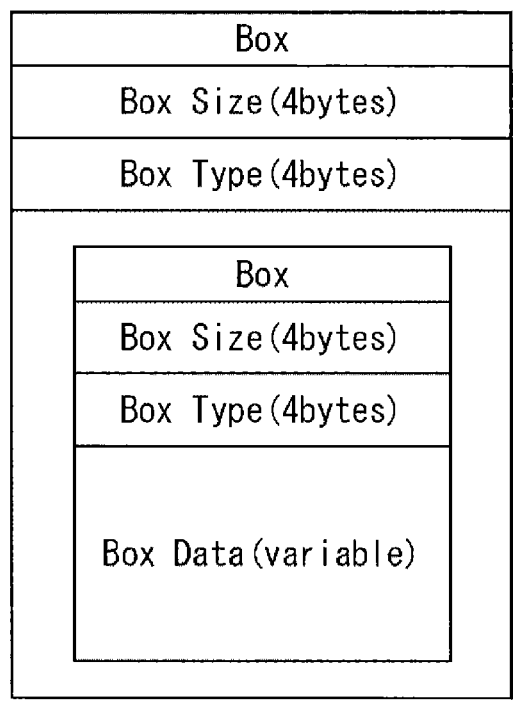
FIG. 3 is a diagram illustrating a hierarchical structure of a BOX.

In the MP4 file format, the above-described BOX is defined so as to have a hierarchical structure. That is, as illustrated in FIG. 3, a BOX at a lower hierarchy can be stored in the Box Data area of a BOX at a higher hierarchy.

Figure 4:
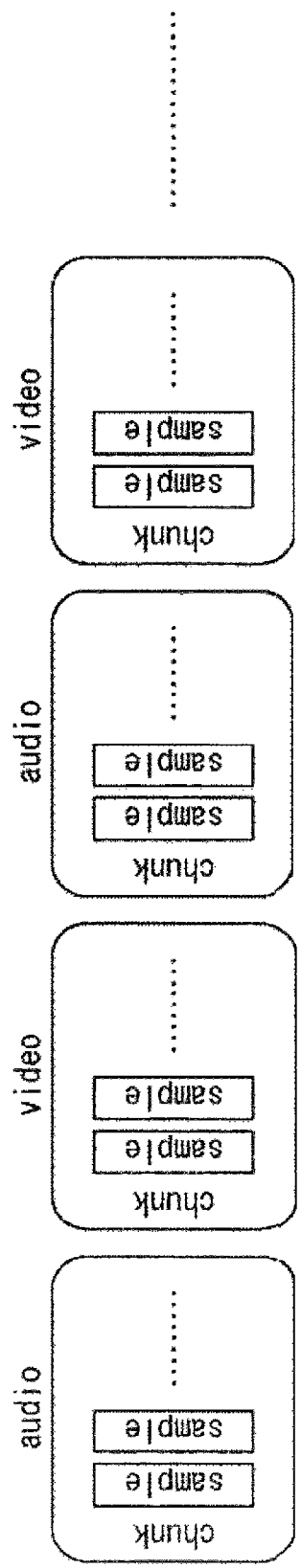
FIG. 4 is a diagram illustrating streaming using the MP4 file format.

In the MP4 file format, the unit data of transmitted content, for example, a decoding unit of audio data, or one frame of video data is called a Sample. A plurality of Samples then forms a Chunk. For example, as illustrated in FIG. 4, Chunks of audio and Chunks of video form streaming.

In the MP4 file format, for example, a set of Chunks in a series of videos, and a set of Chunks in a series of audios are each called a Track. Data which is formed by integrating a plurality of Tracks is called a Movie.

Figure 5:
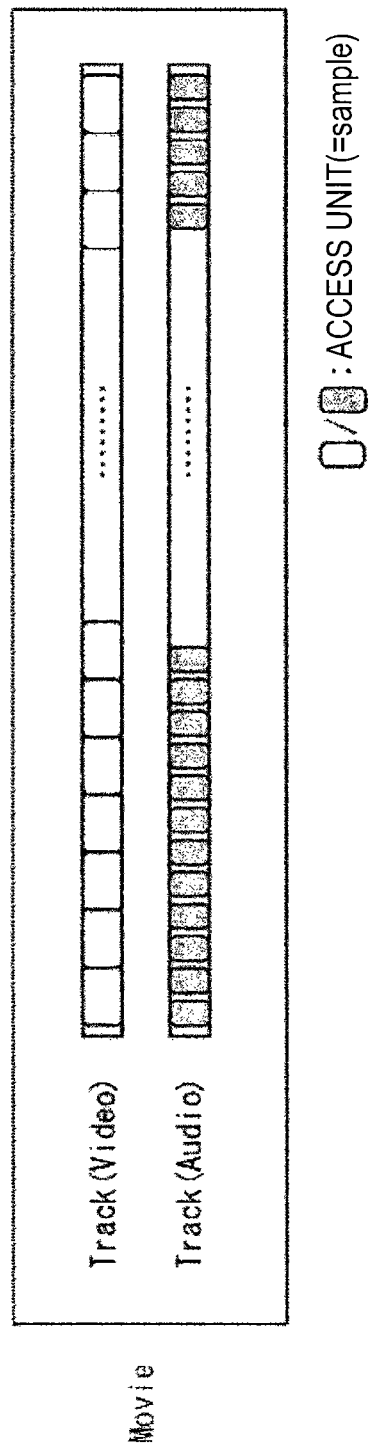
FIG. 5 is a diagram illustrating a configuration of a Movie.
Figure 6:
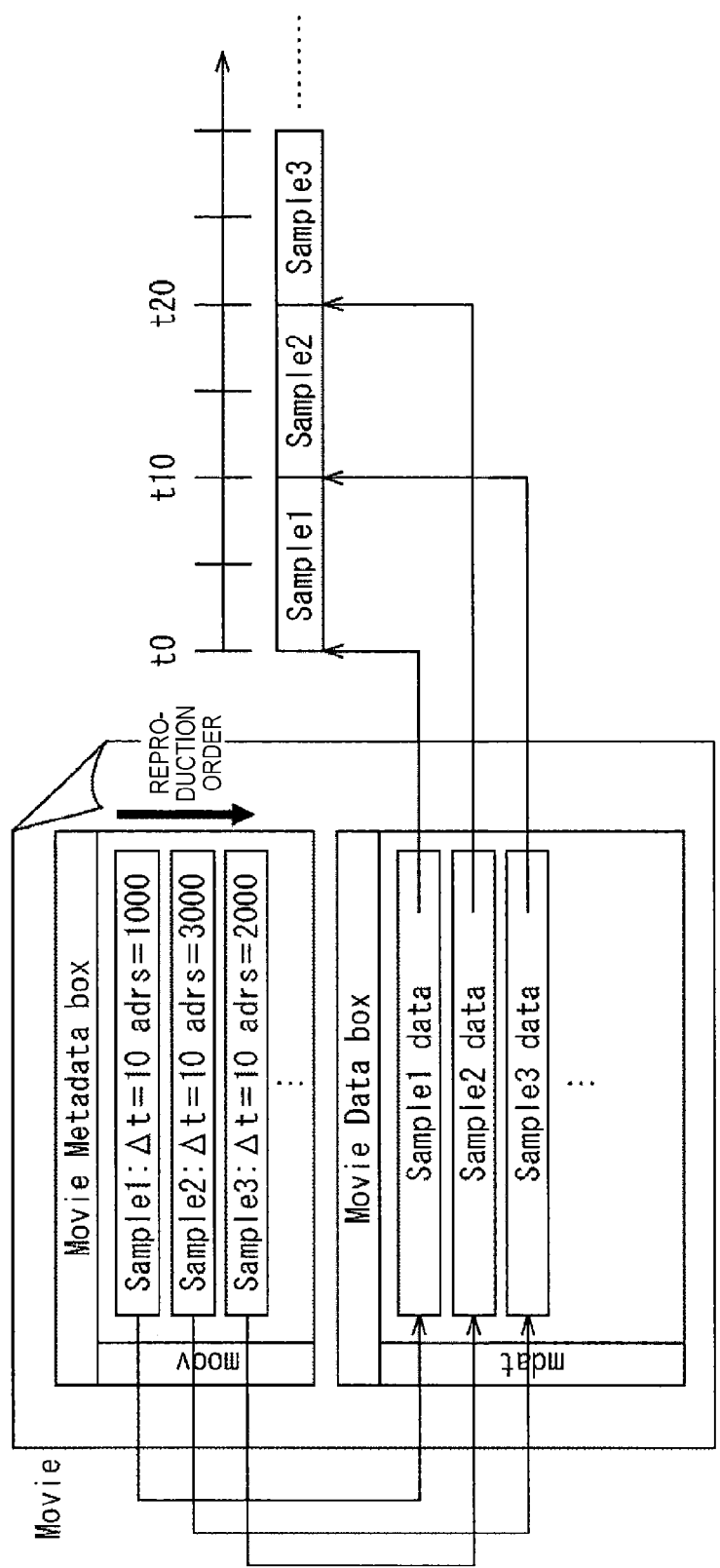
FIG. 6 is a diagram illustrating a BOX structure in a Movie.

FIG. 5 is a diagram illustrating a configuration of a Movie. In the example of FIG. 5, a Movie is formed by a video Track and an audio Track. As described above, a Movie has a BOX structure. FIG. 6 is a diagram illustrating a BOX structure in a Movie. In the example of FIG. 6, a Movie Metadata box and a Movie Data box are stored in the BOX of the Movie.

The Movie Metadata box is a BOX in which information related to the storage position of each Sample stored in the Movie Data box and information related to a reproduction time and a reproduction time interval are described. For example, adrs=1000 or the like is described as information related to the storage position of each Sample, and Δt=10 or the like is described as information related to a reproduction time and a reproduction time interval. A codec parameter or the like is described as necessary. The Movie Data box is a BOX in which each Sample is stored. According to the specification of the MP4 file format, Movie Metadata box is called moov and Movie Data box is called mdat.

Sample1, Sample2, Sample3, . . . can be reproduced at time t0, t10, t20, . . . by receiving and analyzing the Movie as illustrated in FIG. 6 with a receiver.

The Movie is generally classified into two types. One is called a Non-fragment Movie, which is suitable, for example, for transmission of a content such as a movie or a drama. The other is called a Fragmented Movie, which is suitable, for example, for transmission of a content such as news or a sport relay broadcast.

Figure 7:
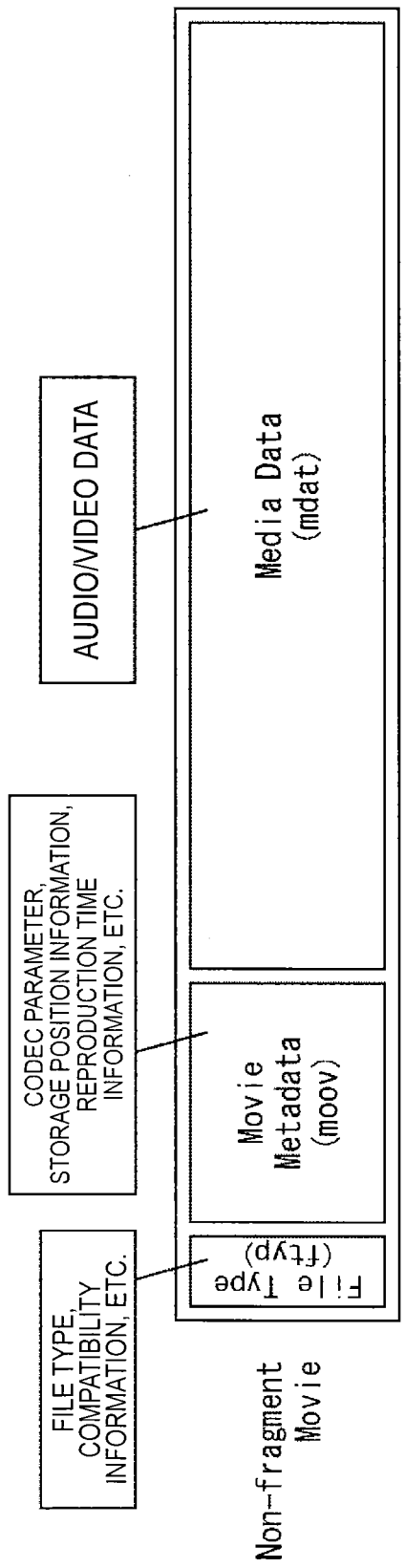
FIG. 7 is a diagram illustrating a configuration of a Non-fragment Movie.

FIG. 7 is a diagram illustrating the configuration of the Non-fragment Movie.

As illustrated in FIG. 7, a BOX called a File Type (ftyp) is disposed at the head of the Non-fragment Movie. The ftyp is a BOX in which a file type, compatibility information or the like are stored. The above-described moov and mdat are disposed subsequent to the ftyp. As described above, in the moov, a codec parameter, a storage position information, reproduction time information or the like are described. As described above, in the mdat, Samples including a decoding unit of audio data and one frame of video data are stored.

In a Non-fragment Movie, the rendering context of the entire Movie is defined by the moov. That is, in the case of content such as a movie or a drama, it is known beforehand that which video, which audio, and which subtitle are to be reproduced at which timing, and thus the rendering context of the entire Movie can be defined before each Sample is received.

On the other hand, in the case of live content such as news or a sport relay broadcast, it is not known beforehand that which video, which audio, and which subtitle are to be reproduced at which timing. For this reason, a Fragmented Movie is adopted for transmission of a live content.

Figure 8:
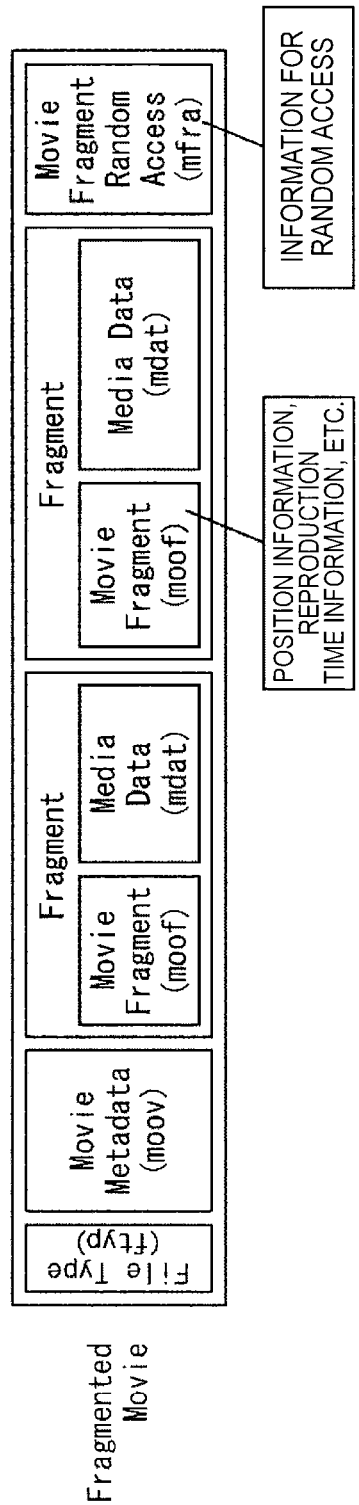
FIG. 8 is a diagram illustrating a configuration of a Fragmented Movie.

FIG. 8 is a diagram illustrating a configuration of a Fragmented Movie.

As illustrated in FIG. 8, similarly to the case of Non-fragment Movie, the ftyp and moov are disposed in the Fragmented Movie, however, a plurality of BOXes called Fragments is disposed following the ftyp and moov. A Fragment includes a BOX called a Movie Fragment (moot) and a mdat. In the example of FIG. 8, each Fragment includes a moof which is, so to speak, the header information of the Fragment. In the moof, there are described the storage position information, the reproduction time information or the like regarding the Sample in the mdat stored in the Fragment. That is, in contrast to the case of Non-fragment Movie, the rendering context for each Fragment is defined in each Fragment in the Fragmented Movie.

The Movie Fragment Random Access (mfra) illustrated in FIG. 8 is a BOX which is inserted in the end of the Fragmented Movie and which stores information for random access or the like.

The examples illustrated in FIGS. 7 and 8 each illustrate the configuration of a Movie as the MP4 file format, and for example, when internet streaming or the like is performed, the above-described data is distributed in a predetermined transmission format as seen from FIGS. 7 and 8. In the transmission format, for example, the moov illustrated in FIG. 8 is inserted between Fragments and is distributed repeatedly multiple times.

On the other hand, as described above, for standardization of internet streaming such as the IPTV, whether the MP4 file format is used as the format to be adopted in the container layers is being discussed. When a subtitle is included as a component of streaming, the TTML is often used and has received attention in standardization of streaming.

For example, when a subtitle is inserted in a video of live content such as news, the character string (text information) for the subtitle cannot be determined beforehand. For this reason, it is necessary to perform processing of inserting the character string for the subtitle as needed during streaming of a broadcast. In such a case, it is preferable, for example, for a receiver to receive a TTML Initialization Document Instance and to analyze a rendering context, then to receive a Body Document Instance as needed.

However, fragmented pieces of text information, which are sent separately from one Body Document Instance to another in this manner, are independent from one Body Document Instance to another. Therefore, when a subsequent piece of text information display is attempted to be made while a certain fragmented piece of text information is displayed, the previous piece of text information display cannot be continued. Particularly, in a live content such as news, it is not known beforehand that which video, which audio, and which subtitle are to be reproduced at which timing, and a technical method for continuing to display currently displayed text information has not been established.

Thus, in the present technology, when the text information of a subtitle is inserted in a content which is transmitted as a Fragmented Movie, continuous display of the fragmented text information is made possible.

[Streaming Distribution System]

Figure 9:
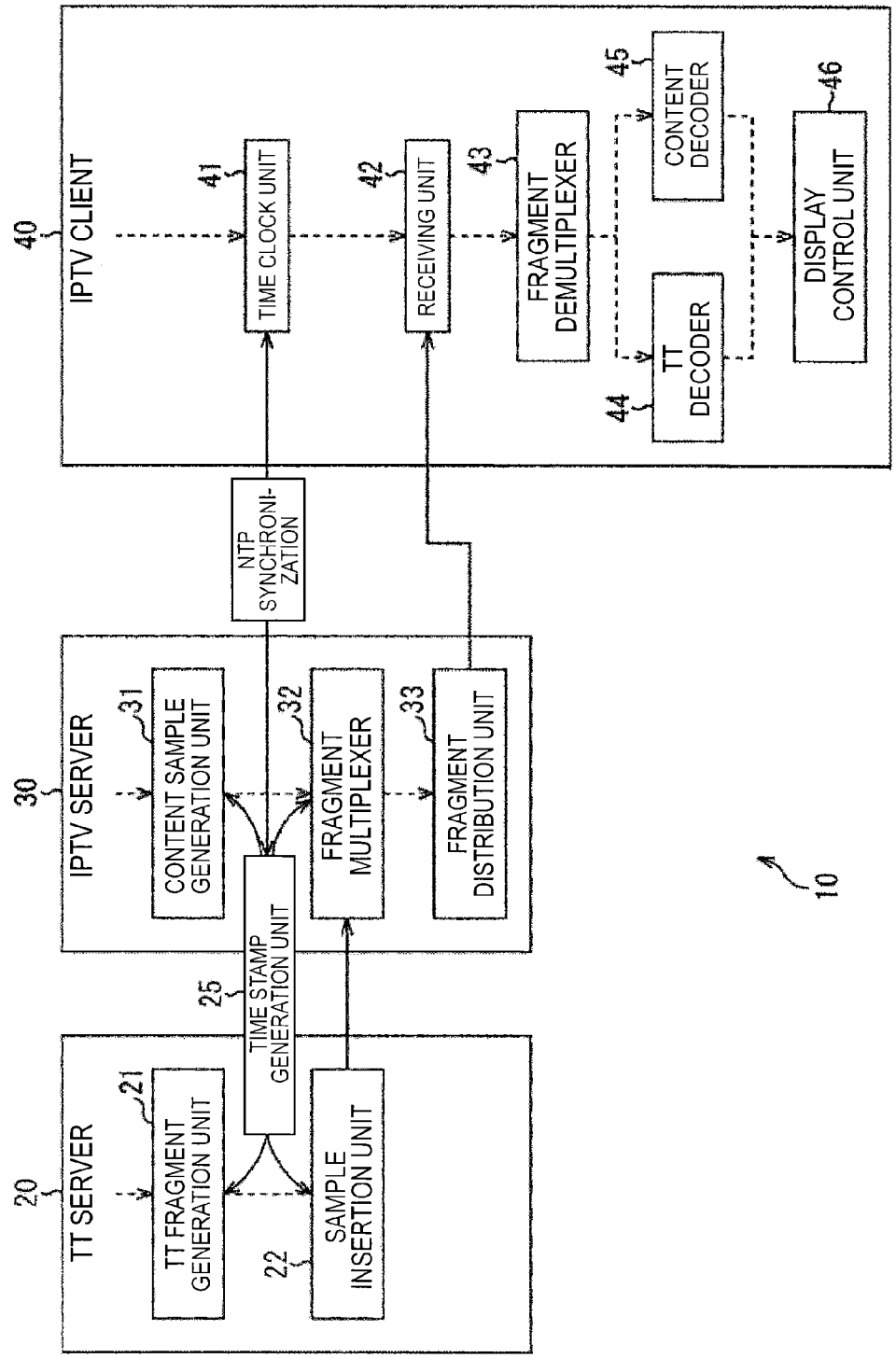
FIG. 9 is a diagram illustrating a configuration example of a streaming distribution system according to an embodiment of the present technology.

FIG. 9 is a diagram illustrating a configuration example of a streaming distribution system according to an embodiment of the present technology. The streaming distribution system 10 illustrated in FIG. 9 includes a TT server 20, an IPTV server 30, and an IPTV client 40.

The IPTV server 30 is formed, for example, as a transmitter that broadcasts contents via streaming, and the IPTV client 40 is formed, for example, as a receiver that receives a broadcast via streaming. The TT server 20 is a device that generates data related to a subtitle to be inserted in the content which is broadcast via streaming.

The TT server 20 includes a TT fragment generation unit 21 and a sample insertion unit 22.

The TT fragment generation unit 21 generates Fragment data in which a TTML Document Instance is stored, and supplies the Fragment data to the sample insertion unit 22. Here, referring to FIG. 8, Fragment data, in which the TTML Document Instance as described above is stored, is generated.

The sample insertion unit 22 generates a TTML Document Instance. The sample insertion unit 22 inserts the generated TTML Document Instance as a Sample of the mdat in the Fragment data from the TT fragment generation unit 21. The sample insertion unit 22 outputs the Fragment data to the IPTV server 30, the Fragment data having the TTML Document Instance inserted therein.

An NTP synchronized time stamp generated by a time stamp generation unit 25 is suitably supplied to the TT fragment generation unit 21 and the sample insertion unit 22.

The IPTV server 30 includes a content sample generation unit 31, a fragment multiplexer 32, and a fragment distribution unit 33.

The content sample generation unit 31 encodes, for example, data of an audio or a video included in a content, and generates audio data, video data or the like. The content sample generation unit 31 generates a Sample based on those audio data, video data or the like, and supplies the Sample to the fragment multiplexer 32.

The Fragment data from the sample insertion unit 22 of the TT server 20 and the Sample data from the content sample generation unit 31 are supplied to the fragment multiplexer 32. The fragment multiplexer 32 generates a Fragment having a mdat in which the Sample data from the content sample generation unit 31 is stored.

The fragment multiplexer 32 multiplexes the generated Fragment data and the Fragment data from the sample insertion unit 22. That is, the Fragment in which audio data, video data are stored, and the Fragment in which the TTML Document Instance is stored are multiplexed. The fragment multiplexer 32 supplies the multiplexed Fragment data to the fragment distribution unit 33.

The fragment distribution unit 33 distributes the multiplexed Fragment data from the fragment multiplexer 32 via a network or the like. In this manner, the content is distributed via streaming.

The NTP synchronized time stamp generated by the time stamp generation unit 25 is suitably supplied to the content sample generation unit 31 and the fragment multiplexer 32.

The IPTV client 40 includes a time clock unit 41, a receiving unit 42, a fragment demultiplexer 43, a TT decoder 44, a content decoder 45, and a display control unit 46.

The time clock unit 41 supplies NTP synchronized time information to each unit of the IPTV client 40.

The receiving unit 42 receives a Fragmented Movie transmitted from the IPTV server 30 via a network, and supplies the Fragmented Movie to the fragment demultiplexer 43.

The fragment demultiplexer 43 acquires the Fragmented Movie from the receiving unit 42 and extracts each Fragment included in the Fragmented Movie. The fragment demultiplexer 43 analyzes the description of moov to determine whether or not the Fragmented Movie includes a Fragment in which a TTML Document Instance is stored.

When it is determined that a Fragment in which a TTML Document Instance is stored is included, the fragment demultiplexer 43 supplies the data of the Fragment to the TT decoder 44. On the other hand, when it is determined that a Fragment in which a TTML Document Instance is stored is not included, the fragment demultiplexer 43 supplies the data of the Fragment to the content decoder 45.

The data of the Fragment, in which the TTML Document Instance from the fragment demultiplexer 43 is stored, is supplied to the TT decoder 44. The TT decoder 44 decodes the data of a Sample in which the TTML Document Instance is stored. The decoding by the TT decoder 44 primarily means syntactic analysis of TTML Document Instances.

The TT decoder 44 analyzes the description of the moof in the Fragment to determine the type of the TTML Document Instance stored in the Fragment. When it is determined that the type of the TTML Document Instance is Initialization Document Instance, the TT decoder 44 analyzes the description of the Initialization Document Instance stored in the Sample of the mdat, and set a rendering context.

After a rendering context is once set, only in the case where it is determined that the Initialization Document Instance has been modified, the TT decoder 44 analyzes the description of the Initialization Document Instance stored in the Sample of the mdat, and sets a rendering context again.

When it is determined that the type of the TTML Document Instance is Body Document Instance, the TT decoder 44 analyzes the Body Document Instance stored in the Sample of the mdat, and generates display data of a subtitle. The display data of the subtitle generated here along with information related to display time is supplied to the display control unit 46.

The data of the Fragment, in which the TTML Document Instance from the fragment demultiplexer 43 is not stored, is supplied to the content decoder 45. The content decoder 45 decodes the audio data, the video data or the like which are stored in the Sample of the mdat, and generates video display data, audio output data or the like. The video display data, audio output data or the like generated here along with information related to display time, output time or the like are supplied to the display control unit 46.

Information from the TT decoder 44 related to the display data and display time of the subtitle, or information related to video display data and display time and information related to audio output data and output time from the content decoder 45 are supplied to the display control unit 46.

The display control unit 46 generates video signals for superimposing and displaying the subtitle on the video of the content based on the information related to display time, and supplies the video signals to a display (not illustrated) in a subsequent stage. In addition, the display control unit 46 generates audio signals for outputting the audio of the content based on the information related to the output time, and supplies the audio signals to a speaker (not illustrated) in a subsequent stage.

The streaming distribution system 10 is formed as described above.

[Display Example of Subtitle]

Figure 10:
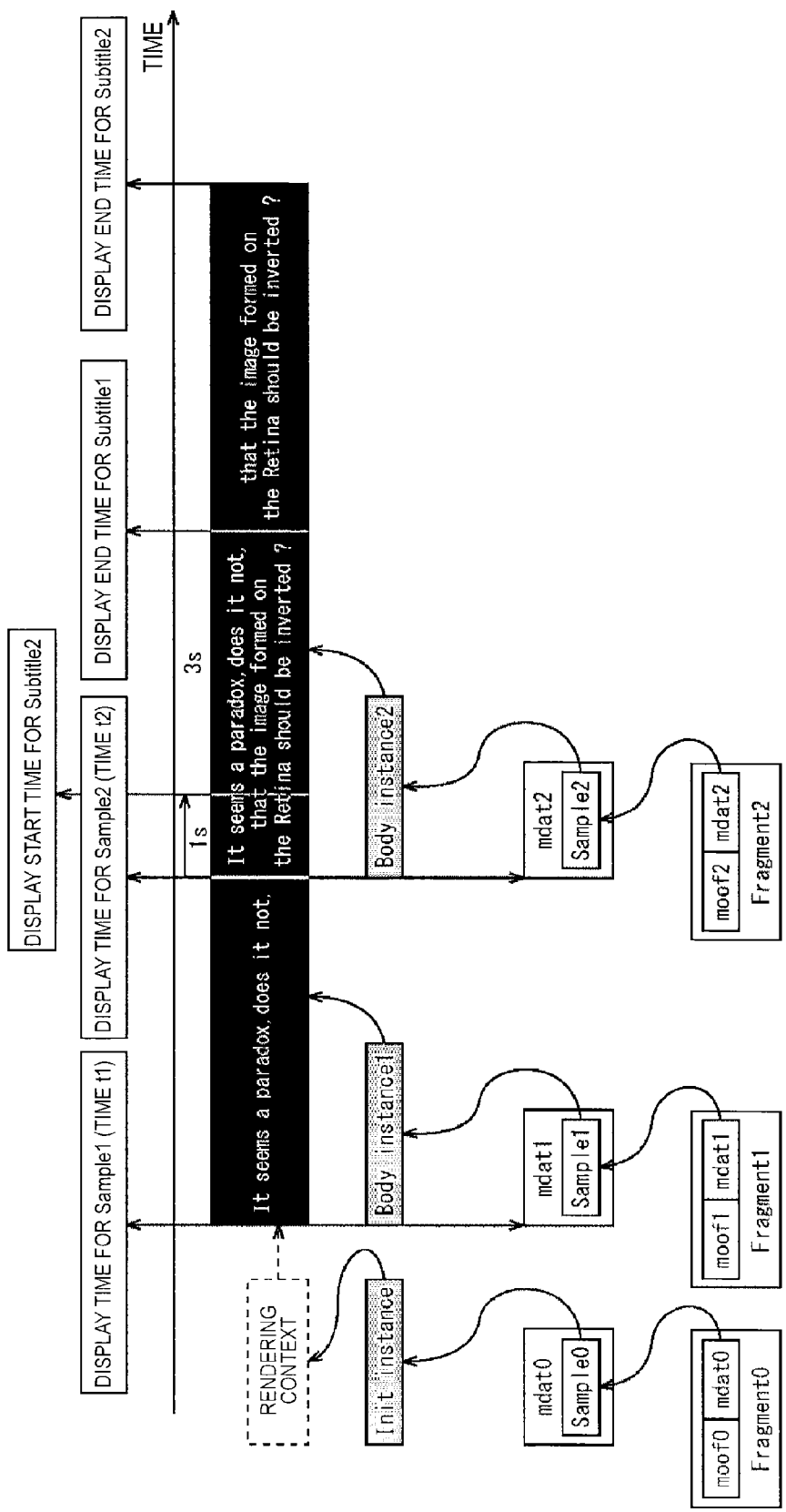
FIG. 10 is a diagram illustrating subtitles which are superimposed and displayed on a video in time series in an IPTV client.

By the streaming distribution system 10 of FIG. 9, display of subtitles, for example, as shown below can be controlled. FIG. 10 is a diagram illustrating subtitles in time series which are superimposed and displayed on the video of a content in the IPTV client 40 which receives the content distributed live as a Fragmented Movie.

For example, when the TTML Document Instance (Init Instance) as illustrated in FIG. 11 is stored in a Fragment by the TT server 20 and is distributed from the IPTV server 30, the data of Fragment0 distributed as a Fragmented Movie is received by the IPTV client 40.

FIG. 11 is an example of description of an Initialization Document Instance. In the example of FIG. 11, description is written to specify the color, the font or the like of the characters of the subtitle, and "subtitleArea1" and "subtitleArea2" are described as the display position of the subtitle.

Returning to FIG. 10, when Fragment0, in which the Sample (Sample0) in mdat0 is stored, is acquired by the IPTV client 40, the Sample storing the Initialization Document Instance of FIG. 11, rendering contexts such as the color, the font, and the display position of the characters of text information to be displayed as the subtitle are specified.

Figures 12, 13:
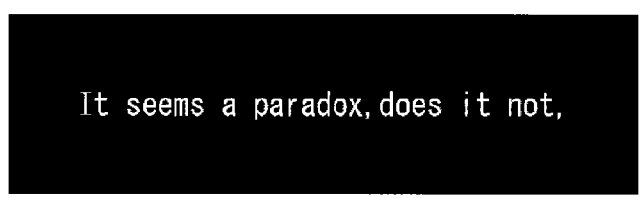
FIG. 12 is a figure illustrating a description example of a Body Document Instance.
FIG. 13 is a figure illustrating a display example of a subtitle.

When the TTML Document Instance (Body Instance1) as illustrated in FIG. 12 is stored in a Fragment by the TT server 20 and is distributed from the IPTV server 30, the data of Fragment1 distributed as a Fragmented Movie is received by the IPTV client 40.

FIG. 12 is an example of description of a Body Document Instance. In the example of FIG. 12, the character string of "It seems a paradox, does it not," specified by the start tag and end tag of p-element is the character string in the subtitle. In addition, an id attribute, a begin attribute, a region attribute are specified as the attributes of p-element. For the id attribute, an ID for identifying the subtitle is specified. For the begin attribute, a display start time of the subtitle is specified. For the region attribute, a character string for specifying the display position of the subtitle is specified.

Returning to FIG. 10, when Fragment1, in which the Sample (Sample1) in mdat1 is stored, is acquired by the IPTV client 40, the Sample storing the Body Document Instance (Body Instance1) of FIG. 12, the character string in the subtitle, specified by the description of FIG. 12 is displayed based on the rendering context which is set according to the description of FIG. 11. That is, "0.1 s" is specified as the begin attribute in the Body Document Instance of FIG. 12, and thus the character string of "It seems a paradox, does it not," as illustrated in FIG. 13 is displayed by the IPTV client 40 after a lapse of 0.1 second since the Body Document Instance is acquired.

In the example of FIG. 12, "subtitle1" is specified as the id attribute, and thus the character string in the subtitle is identified by "subtitle1". Furthermore, "subtitleArea1" is specified as the region attribute, and thus the character string in the subtitle is displayed at the display position specified by "subtitleArea1" of FIG. 11.

Subsequently, when the TTML Document Instance (Body Instance2) as illustrated in FIG. 14 is stored in a Fragment by the TT server 20 and is distributed from the IPTV server 30, the data of Fragment2 distributed as a Fragmented Movie is received by the IPTV client 40.

FIG. 14 is an example of description of a Body Document Instance. In the example of FIG. 14, the character string in the subtitle is formed by the character string of "It seems a paradox, does it not," identified by "subtitle1" which is the id attribute of the p-element in the upper row, and the character string of "that the image formed on the Retina should be inverted ?" identified by "subtitle2" which is the id attribute of the p-element in the lower row. For the p-element in the upper row, "3 s" is specified as the end attribute for specifying the display end time of the subtitle and "subtitleArea1" is specified as the region attribute. In addition, for the p-element in the lower row, "1s", "5s", "subtitleArea2" are specified as the begin attribute, the end attribute, the region attribute, respectively.

Returning to FIG. 10, when Fragment2, in which the Sample (Sample2) in mdat2 is stored, is acquired by the IPTV client 40, the Sample storing the Body Document Instance (Body Instance2) of FIG. 14, the character string in the subtitle, specified by the description of FIG. 14 is displayed based on the rendering context which is set according to the description of FIG. 11. That is, "1 s" is specified in the Body Document Instance of FIG. 14 as the begin attribute of the character string in the subtitle identified by "subtitle2", and thus only the character string of "It seems a paradox and does it not", which is identified by subtitle1 as illustrated in FIG. 15, is displayed by the IPTV client 40 after a lapse of 1 second since the Body Document Instance is acquired.

Subsequently, when 1 second, which is specified by the begin attribute of "subtitle2", elapses since the Body Document Instance of FIG. 14 is acquired, "that the image formed on the Retina should be inverted ?" of "subtitle2" is displayed as illustrated in FIG. 16 in the lower row of the character string of "It seems a paradox, does it not" which is identified by "subtitle1". Because "subtitleArea2" is specified as the region attribute, the character string in the subtitle of "subtitle2" is displayed at the display position specified by "subtitleArea2" of FIG. 11.

The character strings in the subtitle identified by "subtitle1" and "subtitle2" of FIG. 16 are continued to be displayed in the upper and lower rows during the interval from the time specified by the begin attribute of the character string in the subtitle identified by "subtitle2" to the time specified by the end attribute of the character string in the subtitle identified by "subtitle1". When 3 seconds, which is specified by the end attribute of "subtitle1", has elapsed after the Body Document Instance (Body Instance2) of FIG. 14 is acquired, the display of the character string in the subtitle of "subtitle1" is erased, and only the character string in the subtitle of "subtitle2" is on display as illustrated in FIG. 17.

Returning to FIG. 10, subsequently, only the character string in the subtitle, identified by "subtitle2" of FIG. 17 is continued to be displayed during the interval from the time specified by the end attribute of the character string in the subtitle identified by "subtitle1" to the time specified by the end attribute of the character string in the subtitle identified by "subtitle2". When 5 seconds, which is specified by the end attribute of "subtitle2", has elapsed after the Body Document Instance (Body Instance2) of FIG. 14 is acquired, the display of the character string in the subtitle of "subtitle2" is erased and the display of the subtitle is terminated.

In this manner, for example, when the Body Document Instance (Body Instance2) of FIG. 14 is acquired subsequent to the Body Document Instance (Body Instance1) of FIG. 12, the begin attribute of the character string in the subtitle of "subtitle1" is specified by Body Instance1, and the end attribute thereof is specified by Body Instance2. Consequently, even after Body Instance2 is acquired, the character string in the subtitle of "subtitle1" is allowed to be continued to be displayed.

[Streaming Distribution Processing]

Next, the detail of the processing performed by each device included in the streaming distribution system 10 of FIG. 9 will be described.

First, the streaming distribution processing performed by the IPTV server 30 will be described with reference to the flow chart of FIG. 18. The processing is performed, for example, when a subtitle is inserted in a live content and is distributed as a Fragmented Movie via a network or the like.

In step S21, the IPTV server 30 acquires the data of the content. At this point, for example, data or the like of an audio and a video included in the content are acquired.

In step S22, the content sample generation unit 31 encodes, for example, the data of the audio and video included in the content, and generates audio data, video data or the like. The content sample generation unit 31 then generates data of a Sample based on those audio data and video data.

In step S23, the fragment multiplexer 32 generates a Fragment which stores the data of the Sample generated in step S22 into the mdat.

In step S24, the TT server 20 performs subtitle data insertion processing. Thus, data related to the subtitle is inserted in the data of a content to be distributed via streaming.

Here, the detail of the subtitle data insertion processing corresponding to step S24 of FIG. 18 will be described with reference to the flow chart of FIG. 19.

In step S41, a TTML sentence is generated.

In step S42, the TT fragment generation unit 21 generates data of a Fragment in which a TTML Document Instance is stored.

In step S43, the sample insertion unit 22 generates a TTML Document Instance based on the TTML sentence generated in step S41 and inserts the TTML Document Instance as a Sample of the mdat in the Fragment generated in step S42.

In step S44, the sample insertion unit 22 outputs the Fragment in which the TTML Document Instance has been inserted by the processing in step S43. Consequently, the Fragment is supplied to the fragment multiplexer 32 of the IPTV server 30.

An NTP synchronized time stamp generated by the time stamp generation unit 25 is suitably supplied to the TT fragment generation unit 21 and the sample insertion unit 22.

Figure 18:
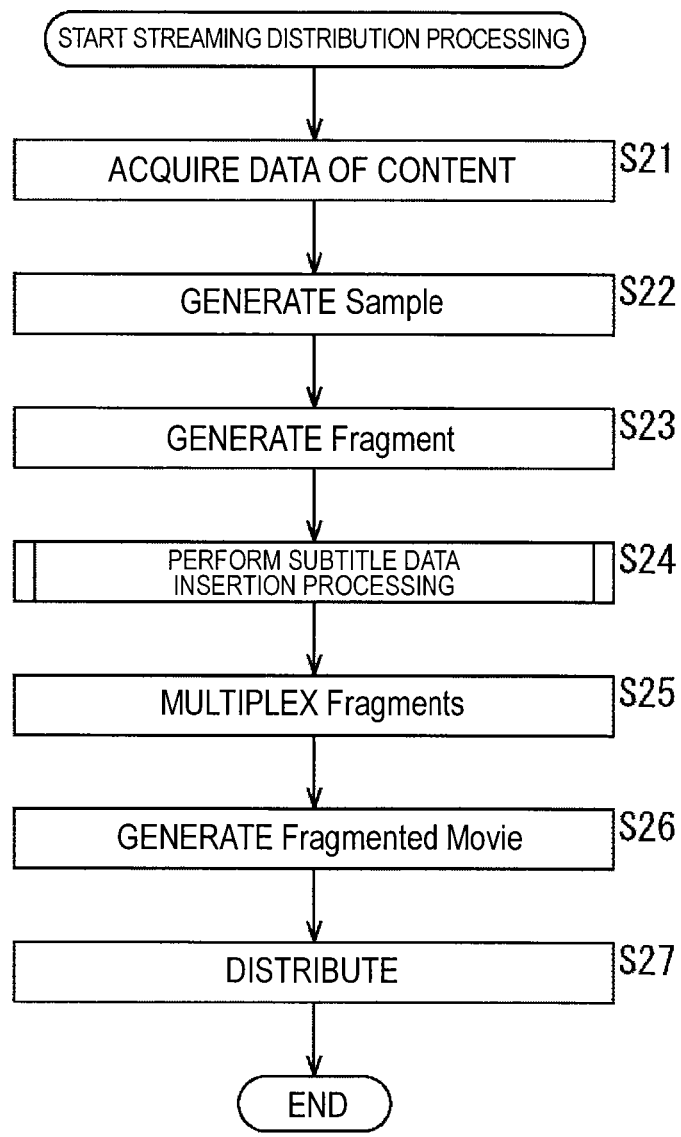
FIG. 18 is a flow chart illustrating streaming distribution processing.
Figure 19:
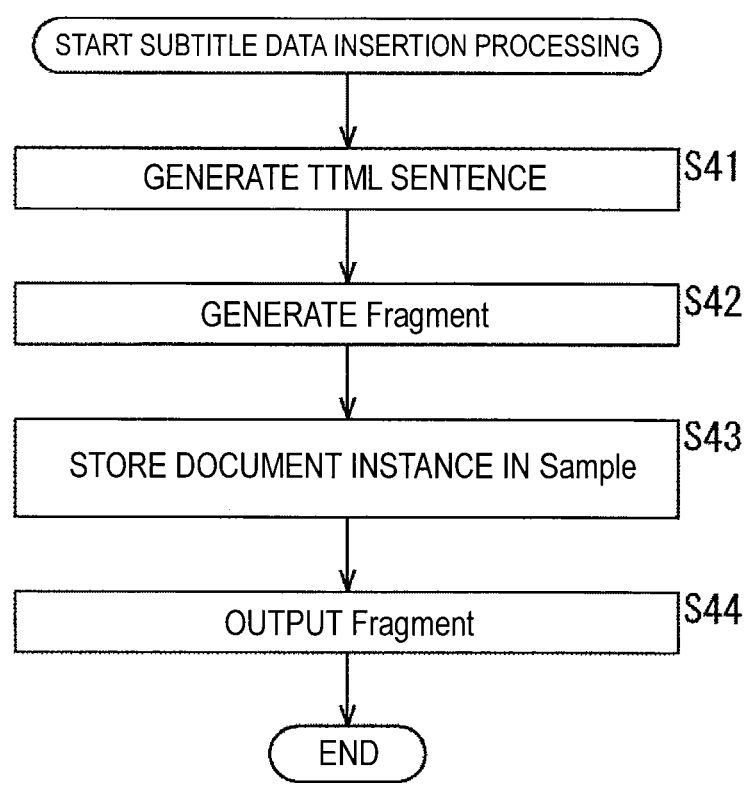
FIG. 19 is a flow chart illustrating subtitle data insertion processing.

Returning to the flow chart of FIG. 18, after the processing in step S24, in step S25, the fragment multiplexer 32 multiplexes the Fragment generated in step S42 of FIG. 19 and the Fragment generated in step S23. That is, here, the Fragment in which audio data and video data or the like are stored, and the Fragment in which a TTML Document Instance is stored are multiplexed.

In step S26, the fragment multiplexer 32 generates data of a Fragment Movie.

In step S27, the fragment distribution unit 33 distributes the Fragment Movie generated in step S26 via a network or the like.

The streaming distribution processing is performed as described above.

Next, the content reproduction processing performed by the IPTV client 40 will be described with reference to the flow chart of FIG. 20.

In step S61, the receiving unit 42 receives the Fragment Movie distributed in step S27 of FIG. 18.

In step S62, the fragment demultiplexer 43 analyzes the description of the moov in the Fragment Movie received in step S61.

In step S63, the fragment demultiplexer 43 extracts the Fragments included in the Fragment Movie received in step S61.

In step S64, the fragment demultiplexer 43 determines whether or not the Fragment Movie includes a Fragment in which a TTML Document Instance is stored, based on a result of the analysis in step S62.

In step S64, when it is determined that the Fragment Movie includes a Fragment in which a TTML Document Instance is stored, the processing proceeds to step S65.

In step S65, the fragment demultiplexer 43 checks the description of the moof in each Fragment.

In step S66, the fragment demultiplexer 43 determines whether or not a TTML Document Instance is stored in the Fragment.

In step S66, when it is determined that no TTML Document Instance is stored in the Fragment, the processing proceeds to step S68 described below. On the other hand, in step S66, when the fragment demultiplexer 43 determines that a TTML Document Instance is stored in the Fragment, the processing proceeds to step S67.

In step S67, the TT decoder 44 performs TT decode processing.

In the TT decode processing, when a result of the analysis of the description of the moof in the Fragment indicates that the type of the TTML Document Instance is an Initialization Document Instance, the description of the Initialization Document Instance stored in the Sample of the mdat is analyzed, and a rendering context is set. When the type of the TTML Document Instance is a Body Document Instance, the Body Document Instance stored in the Sample of the mdat is analyzed, and display data of a subtitle is generated. The display data of a subtitle, along with the information related to display time specifying start of display and/or end of display, is supplied to the display control unit 46.

The detail of the TT decode processing will be described below with reference to FIGS. 21 and 22.

On the other hand, in step S64, when it is determined that the Fragment Movie includes no Fragment in which a TTML Document Instance is stored, the processing proceeds to step S68.

In step S68, the content decoder 45 decodes the audio data, the video data or the like stored in the Sample of the mdat.

In step S69, the content decoder 45 outputs video display data, audio output data or the like which have been obtained as a result of the processing in step S68. The video display data, audio output data or the like generated here along with the information related to display time, output time or the like are supplied to the display control unit 46.

In step S70, the display control unit 46 generates video signals for superimposing and displaying the subtitle on the video of the content based on the information related to the display time specifying start of display and/or end of display, and supplies the video signals to a display (not illustrated) in a subsequent stage. In addition, the display control unit 46 generates audio signals for outputting the audio of the content based on the information related to the output time, or the like, and supplies the audio signals to a speaker (not illustrated) in a subsequent stage.

That is, the video display data, the audio output data generated in step S69 of FIG. 20, and the display data of the subtitle generated in step S105 of FIG. 22 described below are synchronized, and displayed or outputted.

In step S71, it is determined whether or not the Fragment Movie has ends. For example, when the Movie Fragment Random Access (mfra) illustrated in FIG. 8 is received, it is determined that the Fragment Movie has ended. When a user issues a command to stop the reception, it is determined that the Fragment Movie has ended.

In step S71, when it is determined that the Fragment Movie has not ended yet, the processing returns to step S63 and the subsequent processing is repeated. On the other hand, in step S71, when it is determined that the Fragment Movie has ended, the content reproduction processing of FIG. 20 is terminated.

The content reproduction processing is performed as described above.

Next, the detail of the TT decode processing corresponding to step S67 of FIG. 20 will be described with reference to the flow chart of FIG. 21.

In step S81, the TT decoder 44 reads a Fragment from the fragment demultiplexer 43.

In step S82, the TT decoder 44 analyzes the description of the moof in the Fragment, and determines whether or not the type of the TTML document instance is an Initialization Document Instance.

In step S82, when it is determined that the type of the TTML Document Instance is not an Initialization Document Instance, the processing proceeds to step S83. In step S83, the TT decoder 44 removes the current Fragment. The processing then returns to step S81 and the subsequent processing is repeated.

On the other hand, in step S82, when it is determined that the type of the TTML document instance is an Initialization Document Instance, the processing proceeds to step S84. In step S84, the TT decoder 44 performs Initialization Document Instance processing, analyzes the description of the Initialization Document Instance stored in the Sample of the mdat, and sets a rendering context.

When setting a rendering context is completed in step S84, the processing proceeds to step S85. In step S85, the TT decoder 44 reads a Fragment from the fragment demultiplexer 43.

In step S86, the TT decoder 44 analyzes the description of the moof in the Fragment, and determines whether or not the type of the TTML Document Instance is an Initialization Document Instance.

In step S86, when it is determined that the type of the TTML Document Instance is not an Initialization Document Instance, the type has to be Body Document Instance, and thus the processing proceeds to step S87. In step S87, the TT decoder 44 performs Body Document Instance processing.

Here, the Body Document Instance processing corresponding to step S87 of FIG. 21 will be described with reference to the flow chart of FIG. 22.

In step S101, the TT decoder 44 performs XML parser processing, and extracts the elements included in the Body Document Instance. The TT decoder 44 performs the processing in step S102 and after sequentially for each of one or a plurality of elements which has been extracted.

In step S102, the TT decoder 44 determines whether or not the extracted element is a p-element. In step S102, when it is determined that the extracted element is not a p-element, the processing proceeds to step S103. In step S103, the TT decoder 44 processes elements other than p-element.

When the processing in step S103 is completed, the processing proceeds to step S108. In step S108, the TT decoder 44 determines whether or not the processing for all elements is completed.

In step S108, when it is determined that the processing for all elements is not completed, the processing returns to step S102 and the determination processing in step S102 is performed. In step S102, when it is determined that the extracted element is a p-element, the processing proceeds to step S104. In step S104, the TT decoder 44 determines whether or not a begin attribute is included in the p-element.

In step S104, when it determined that a begin attribute is included in the p-element, the processing proceeds to step S105. In step S105, the TT decoder 44 processes normal p-element.

For example, when XML parser processing is performed on the Body Document Instance of FIG. 12, normal processing for p-element is performed because a begin attribute is included in the p-element, and thus display data of the subtitle consisting of the character string of "It seems a paradox, does it not," is generated. The generated display data of the subtitle, along with the information related to display time specifying start of display after a lapse of 0.1 second, is supplied to the display control unit 46.

On the other hand, in step S104, when it is determined that a begin attribute is not included in the p-element, the processing proceeds to step S106. In step S106, the TT decoder 44 determines whether or not the same subtitle is already displayed, based on a result of analysis of the id attribute of the p-element.

In step S106, when it is determined that the same subtitle is already displayed, the processing proceeds to step S107. In step S107, the TT decoder 44 causes the subtitle on display to be continuously displayed.

For example, when XML parser processing is performed on the Body Document Instance of FIG. 14, the processing in step S107 is performed because a begin attribute is not included in the p-element in the upper row, and in addition, the subtitle having an id attribute of "subtitle1" is already displayed by the Body Document Instance of FIG. 12. That is, the TT decoder 44 supplies the information related to display time indicating, for example, end of display after a lapse of 3 seconds specified by an end attribute, so that the subtitle on display having an id attribute of "subtitle1" is continued to be displayed.

For example, a begin attribute is included in the p-element in the lower row of the Body Document Instance of FIG. 14, and thus the processing in step S105 is performed. That is, the TT decoder 44 generates display data of the subtitle consisting of the character string of "subtitle2" which is "that the image formed on the Retina should be inverted ?". The generated data of the subtitle, along with the information related to display time specifying start of display after a lapse of 1 second and end of display after a lapse of 5 seconds, is supplied to the display control unit 46.

When the processing in step S105 or S107 is completed, the determination processing in step S108 is performed. In step S108, when it is determined that the processing for all elements has been completed, the processing returns to step S87 of FIG. 21, and the subsequent processing is repeated.

That is, a Fragment is read and it is determined whether or not the type of the TTML Document Instance is an Initialization Document Instance (step S86). When it is determined by the determination processing in step S86 that the type is not an Initialization Document Instance, the Body Document Instance processing is performed again (step S87). On the other hand, when it is determined by the determination processing in step S86 that the type is an Initialization Document Instance, the processing proceeds to step S88.

In step S88, the TT decoder 44 determines whether or not the definition content of the display format of the Initialization Document Instance stored in the read Fragment is different from the definition content of the rendering context currently set.

In step S88, when it is determined that the definition content of the display format is different from the definition content of the rendering context, the processing proceeds to step S84 and the subsequent processing is repeated. That is, the Initialization Document Instance processing is performed again, and the rendering context is set again (step S84). On the other hand, in step S88, when it is determined that the definition content of the display format is the same as the definition content of the rendering context, the processing returns to step S85 and the subsequent processing is repeated. That is, in this case, the rendering context is not set again, and a Fragment is read again from the fragment demultiplexer 43.

Figure 20:
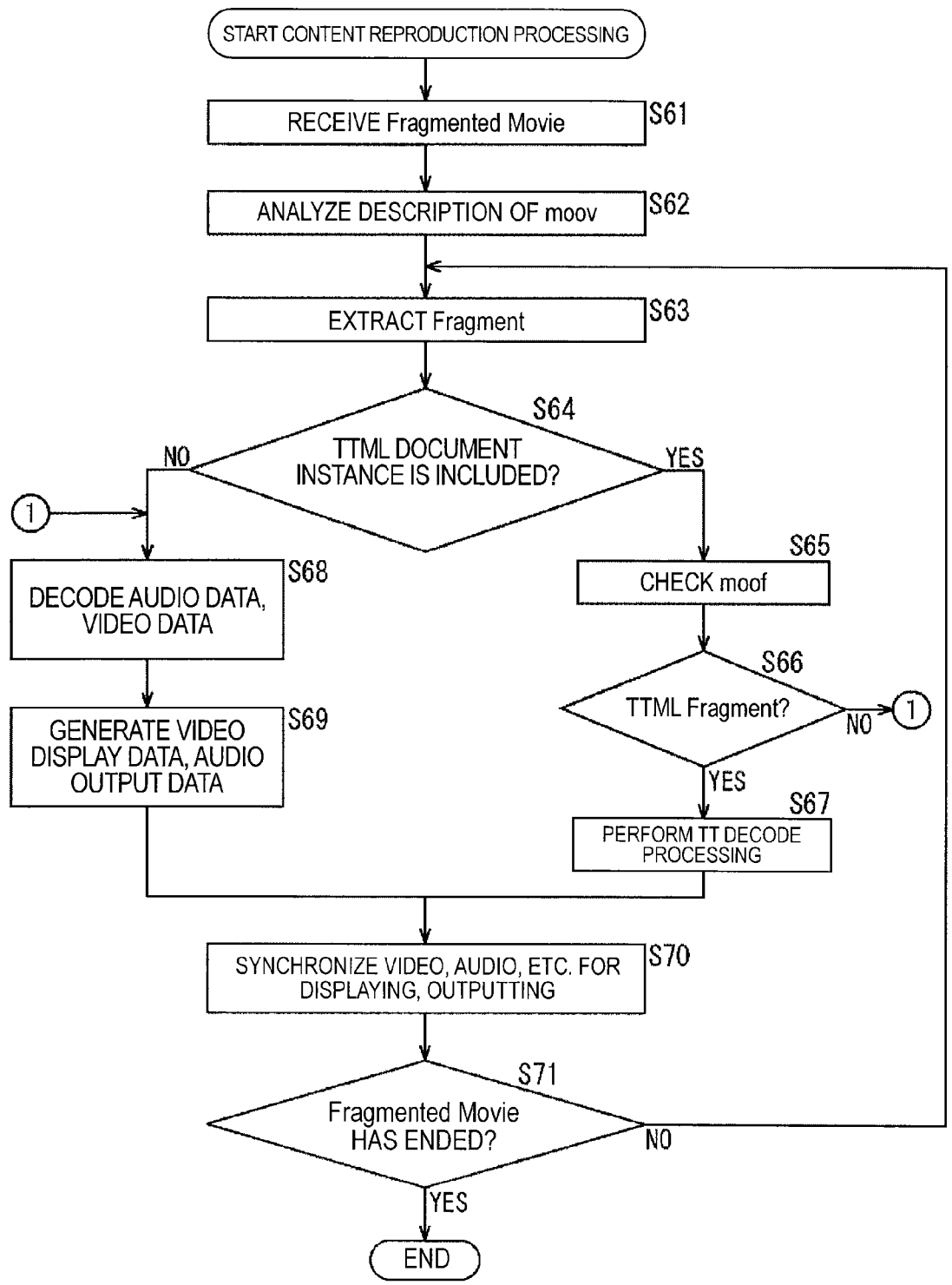
FIG. 20 is a flow chart illustrating content reproduction processing.
Figure 21:
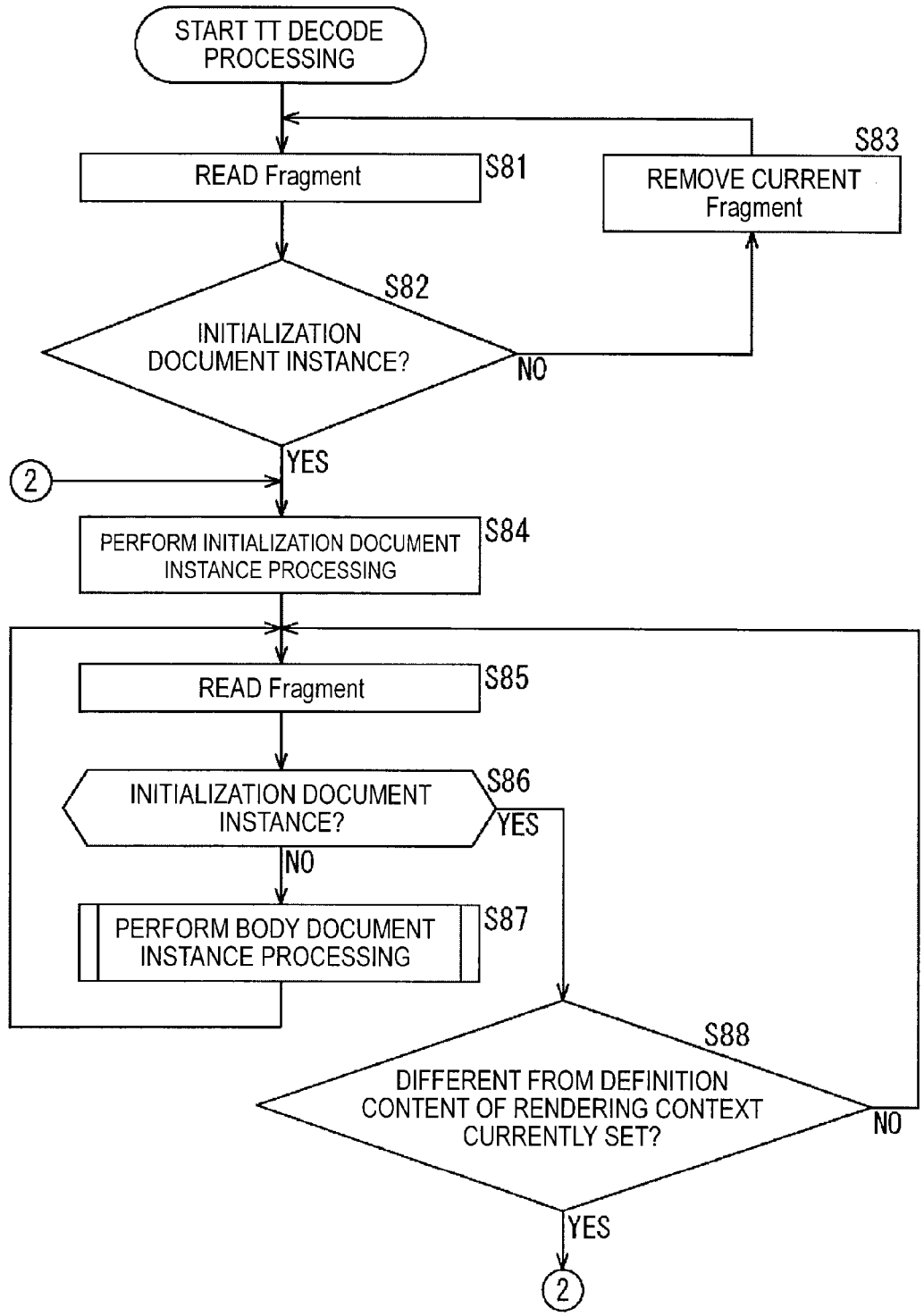
FIG. 21 is a flow chart illustrating TT decode processing.
Figure 22:
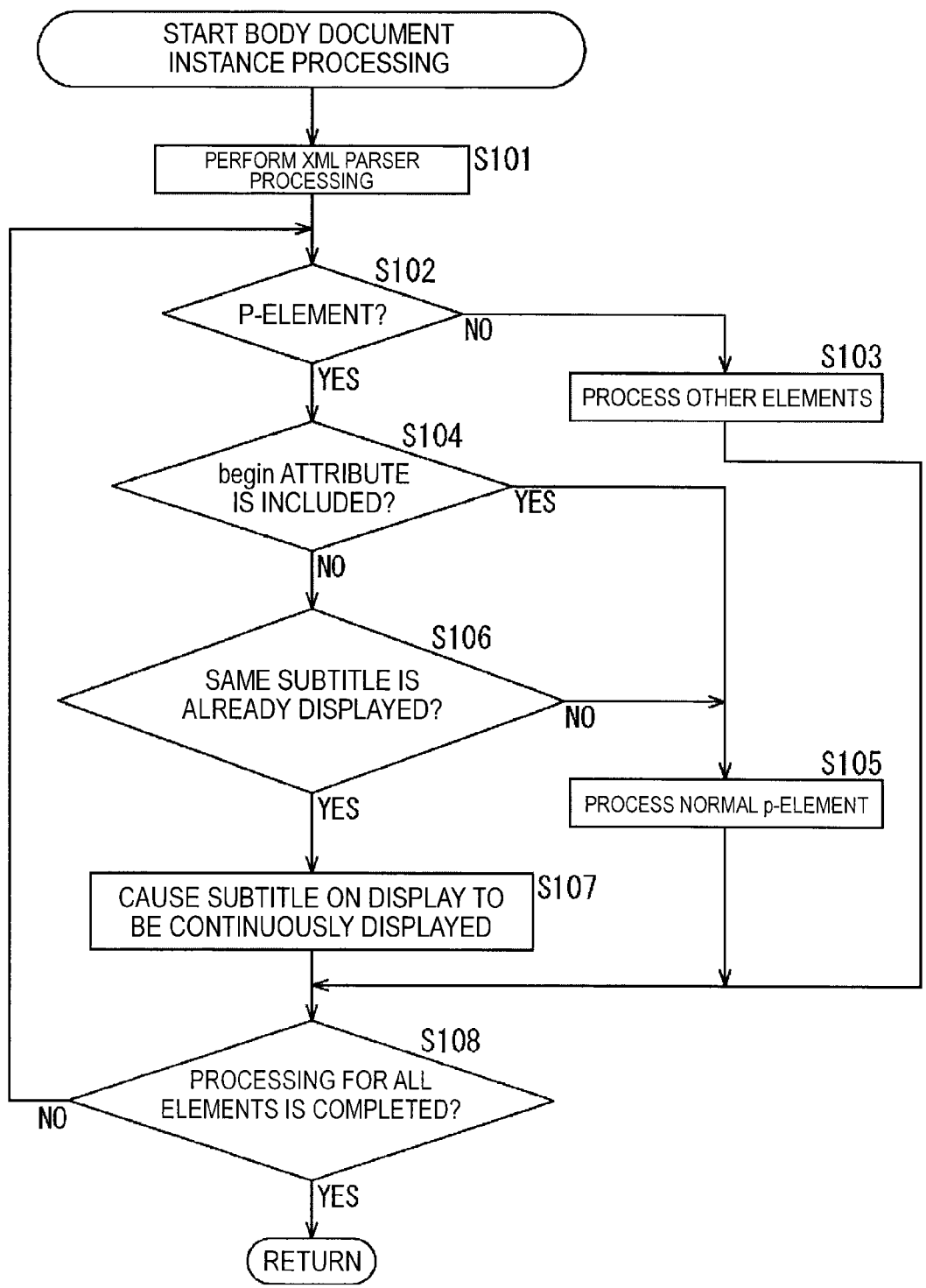
FIG. 22 is a flow chart illustrating Body Document Instance processing.

In step S71 of FIG. 20, the TT decode processing of FIG. 21 is repeatedly performed until it is determined that the Fragment Movie has ended and so the content reproduction processing of FIG. 20 is completed.

So far, the TT decode processing has been described with reference to FIGS. 21 and 22.

As described above, a begin attribute is attached to a subtitle which is described in the Body Document Instance stored in a first read Fragment, and an end attribute is attached to the same subtitle which is described in the Body Document Instance stored in a subsequently read Fragment, thereby allowing display of the subtitle of the first read Fragment to be continued even after the subsequent Fragment is read.

[Configuration Example of Computer to Which Present Technology is Applied]

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 23:
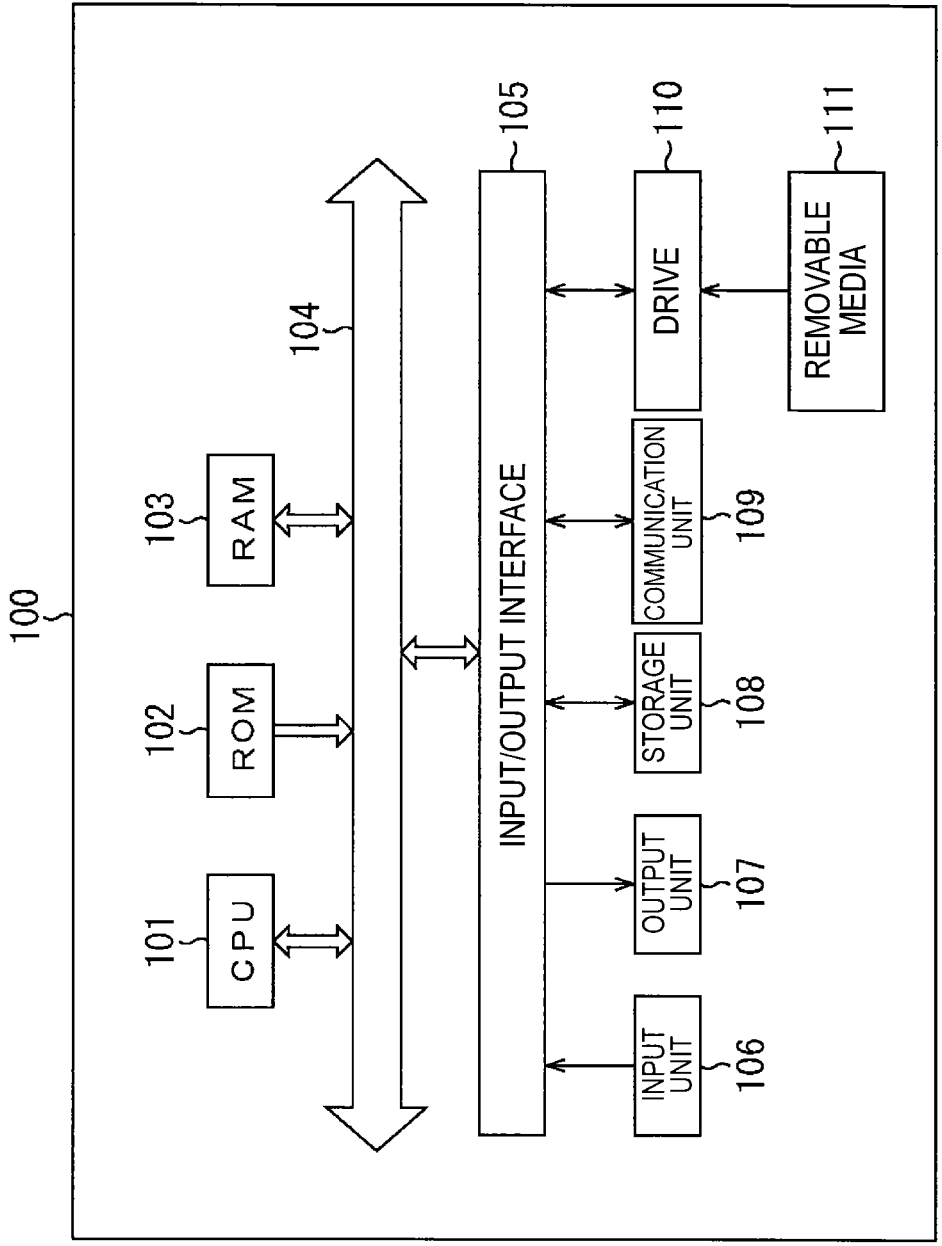
FIG. 23 is a diagram illustrating a configuration example of a computer.

FIG. 23 is a block diagram showing a hardware configuration example of a computer that performs the above-described series of processing using a program.

In the computer 100, a central processing unit (CPU) 101, a read only memory (ROM) 102 and a random access memory (RAM) 103 are mutually connected by a bus 104.

An input/output interface 105 is also connected to the bus 104. An input unit 106, an output unit 107, a storage unit 108, a communication unit 109, and a drive 110 are connected to the input/output interface 105.

The input unit 106 is configured from a keyboard, a mouse, a microphone or the like. The output unit 107 is configured from a display, a speaker or the like. The storage unit 108 is configured from a hard disk, a non-volatile memory or the like. The communication unit 109 is configured from a network interface or the like. The drive 110 drives a removable media 111 such as a magnetic disk, an optical disk, a magneto-optical disk, a semiconductor memory or the like.

In the computer 100 configured as described above, the CPU 101 loads a program that is stored, for example, in the storage unit 108 onto the RAM 103 via the input/output interface 105 and the bus 104, and executes the program. Thus, the above-described series of processing is performed.

Programs to be executed by the computer 100 (the CPU 101) are provided being recorded in the removable media 111 which is a packaged media or the like. Also, programs may be provided via a wired or wireless transmission medium, such as a local area network, the Internet or digital satellite broadcasting.

In the computer 100, by inserting the removable media 111 into the drive 110, the program can be installed in the storage unit 108 via the input/output interface 105. Further, the program can be received by the communication unit 109 via a wired or wireless transmission media and installed in the storage unit 108. Moreover, the program can be installed in advance in the ROM 102 or the storage unit 108.

It should be noted that the program executed by a computer 100 may be a program that is processed in time series according to the sequence described in this specification or a program that is processed in parallel or at necessary timing such as upon calling.

A processing step herein for describing a program which causes the computer 100 to perform various processing does not necessarily have to be processed chronologically in the order described in a flow chart. It also includes processing performed in parallel or individually (for example, parallel processing or processing by an object).

The program may be processed by one computer or by a plurality of computers in a distributed manner. Further, the program may be performed after being transferred to a remote computer.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technology may also be configured as below.

(1)

A receiving device including:

a receiving unit configured to receive a stream of a content to be distributed live;

an analysis unit configured to analyze fragmented text information corresponding to subtitle data included in the received stream; and a control unit configured to control display of first text information so as to allow the display to be continued when second text information out of the text information is displayed based on a result of the analysis, the second text information being started to be displayed temporally after the first text information is displayed.

(2)

The receiving device according to (1), wherein the text information includes a structured document that describes a content, and a display definition document that defines a display format which is applied to the structured document, wherein a time indicating start of display of the first text information is described in a first structured document that describes a content of the first text information, wherein a time indicating end of display of the first text information and a time indicating start of display of the second text information are described in a second structured document that describes a content of the second text information, and wherein the control unit starts display of the first text information according to the time indicating the start of display of the first text information described in the first structured document, and later ends display of the first text information on display according to the time indicating the end of display of the first text information described in the second structured document, based on a result of the analysis.

(3)

The receiving device according to (2), wherein the time indicating the start of display of the second text information described in the second structured document is temporally before the time indicating the end of display of the first text information, and wherein the control unit starts display of the second text information according to the time indicating the start of display of the second text information described in the second structured document, based on a result of the analysis.

(4)

The receiving device according to (2) or (3), wherein a time indicating end of display of the second text information is further described in the second structured document, and wherein the control unit ends display of the second text information according to the time indicating the end of display of the second text information described in the second structured document, based on a result of the analysis.

(5)

The receiving device according to (4), wherein the time indicating the end of display of the second text information described in the second structured document is temporally after the time indicating the end of display of the first text information.

(6)

The receiving device according to any one of (2) to (5), wherein the same display definition document is applied to the structured document until a definition content of the display format is modified.

(7)

The receiving device according to any one of (1) to (6), wherein the stream is data of a format which complies with a MP4 file format, and the subtitle data complies with a timed text markup language (TTML) standard.

(8)

A control method performed by a receiving device, the control method including the steps of:

receiving a stream of a content to be distributed live;

analyzing fragmented text information corresponding to subtitle data included in the received stream; and controlling display of the first text information so as to allow the display to be continued when second text information out of the text information is displayed based on a result of the analysis, the second text information being started to be displayed temporally after the first text information is displayed.

(9)

A program for causing a computer to function as:

a receiving unit configured to receive a stream of a content to be distributed live;

an analysis unit configured to analyze fragmented text information corresponding to subtitle data included in the received stream; and a control unit configured to control display of first text information so as to allow the display to be continued when second text information out of the text information is displayed based on a result of the analysis, the second text information being started to be displayed temporally after the first text information is displayed.

(10)

A distribution device including:

a content generation unit configured to generate a stream of a content for live distribution;

a text information acquisition unit configured to acquire fragmented text information so as to allow display of first text information to be continued when second text information is displayed as text information corresponding to subtitle data of the content, the second text information being started to be displayed temporally after the first text information is displayed; and a distribution unit configured to distribute the stream of the content including the subtitle data on live.

(11)

A distribution method performed by a distribution device, the distribution method including the steps of:

generating a stream of a content for live distribution;

acquiring fragmented text information so as to allow display of first text information to be continued when second text information is displayed as text information corresponding to subtitle data of the content, the second text information being started to be displayed temporally after the first text information is displayed; and distributing the stream of the content including the subtitle data on live.

(12)

A program for causing a computer to function as:

a content generation unit configured to generate a stream of a content for live distribution;

a text information acquisition unit configured to acquire fragmented text information so as to allow display of first text information to be continued when second text information is displayed as text information corresponding to subtitle data of the content, the second text information being started to be displayed temporally after the first text information is displayed; and a distribution unit configured to distribute the stream of the content including the subtitle data on live.

(13)

A distribution system including:

a distribution device; and a receiving device, wherein the distribution device including a content generation unit configured to generate a stream of a content for live distribution, a text information acquisition unit configured to acquire fragmented text information so as to allow display of first text information to be continued when second text information is displayed as text information corresponding to subtitle data of the content, the second text information being started to be displayed temporally after the first text information is displayed, and a distribution unit configured to distribute the stream of the content including the subtitle data on live, and wherein the receiving device including a receiving unit configured to receive the stream of the content, an analysis unit configured to analyze the text information fragmented corresponding to the subtitle data included in the received stream, and a control unit configured to control display of the first text information so as to allow the display to be continued when the second text information out of the text information is displayed based on a result of the analysis.

REFERENCE SIGNS LIST 10 streaming distribution system
20 TT server
21 TT fragment generation unit
22 sample insertion unit
25 time stamp generation unit
30 IPTV server
31 content sample generation unit
32 fragment multiplexer
33 fragment distribution unit
40 IPTV client
41 time clock unit
42 receiving unit
43 fragment demultiplexer
44 TT decoder
45 content decoder
46 display control unit
100 computer
101 CPU

The invention claimed is:

1. A receiving device comprising:

circuitry configured to:

receive a stream of a content to be distributed live;

analyze fragmented text information corresponding to subtitle data included in the received stream; and control display of first text information received at a first timing, the first text information including a first character string, so as to continue display of the first character string when second text information received at a second timing after the first timing, the second text information including a second character string, is displayed based on a result of the analysis, the second character string being started to be displayed temporally after the first character string is displayed, wherein the text information includes a structured document that describes the content, and a display definition document that defines a display format which is applied to the structured document, the first text information received at the first timing includes a first structured document that describes the first character string and a time indicating start of display of the first character string, and the first text information does not include a time indicating end of display of the first character string, the second text information received at the second timing after the first timing includes a second structured document that describes the second character string, the time indicating end of display of the first character string, and a time indicating start of display of the second character string, and the circuitry is configured to start display of the first character string at the time indicating the start of display of the first character string described in the first structured document received at the first timing, and later end display of the first character string at the time indicating the end of display of the first character string described in the second structured document received at the second timing after the first timing, based on a result of the analysis.

2. The receiving device according to claim 1, wherein the time indicating the start of display of the second text information described in the second structured document is temporally before the time indicating the end of display of the first text information, and wherein the circuitry starts display of the second text information according to the time indicating the start of display of the second text information described in the second structured document, based on a result of the analysis.

3. The receiving device according to claim 1, wherein a same display definition document is applied to the structured document until a definition content of the display format is modified.

4. The receiving device according to claim 1, wherein the stream is data of a format which complies with a MP4 file format, and the subtitle data complies with a timed text markup language (TTML) standard.

5. The receiving device according to claim 2, wherein a time indicating end of display of the second text information is further described in the second structured document, and wherein the circuitry ends display of the second text information according to the time indicating the end of display of the second text information described in the second structured document, based on a result of the analysis.

6. The receiving device according to claim 5, wherein the time indicating the end of display of the second text information described in the second structured document is temporally after the time indicating the end of display of the first text information.

7. A control method performed by a receiving device, the control method comprising:

receiving a stream of a content to be distributed live;
analyzing fragmented text information corresponding to subtitle data included in the received stream; and
controlling, using circuitry, display of first text information received at a first timing, the first text information including a first character string so as to continue display of the first character string when second text information received at a second timing after the first timing, the second text information including a second character string is displayed based on a result of the analysis, the second character string being started to be displayed temporally after the first character string is displayed, wherein the text information includes a structured document that describes the content, and a display definition document that defines a display format which is applied to the structured document, the first text information received at the first timing includes a first structured document that describes the first character string and a time indicating start of display of the first character string, and the first text information does not include a time indicating end of display of the first character string, the second text information received at the second timing after the first timing includes a second structured document that describes the second character string, the time indicating end of display of the first character string, and a time indicating start of display of the second character string, and the controlling comprises starting display of the first character string at the time indicating the start of display of the first character string described in the first structured document received at the first timing, and later ending display of the first character string at the time indicating the end of display of the first character string described in the second structured document received at the second timing after the first timing, based on a result of the analysis.

8. A non-transitory computer-readable storage medium storing computer-readable instructions thereon, which, when executed by a computer, cause the computer to perform a method comprising:

receiving a stream of a content to be distributed live;
analyzing fragmented text information corresponding to subtitle data included in the received stream; and
controlling display of first text information received at a first timing, the first text information including a first character string so as to continue display of the first character string when second text information received at a second timing after the first timing, the second text information including a second character string is displayed based on a result of the analysis, the second character string being started to be displayed temporally after the first character string is displayed, wherein the text information includes a structured document that describes the content, and a display definition document that defines a display format which is applied to the structured document, the first text information received at the first timing includes a first structured document that describes the first character string and a time indicating start of display of the first character string, and the first text information does not include a time indicating end of display of the first character string, the second text information received at the second timing after the first timing includes a second structured document that describes the second character string, the time indicating end of display of the first character string, and a time indicating start of display of the second character string, and the controlling comprises starting display of the first character string at the time indicating the start of display of the first character string described in the first structured document received at the first timing, and later ending display of the first character string at the time indicating the end of display of the first character string described in the second structured document received at the second timing after the first timing, based on a result of the analysis.

9. A distribution device comprising:
circuitry configured to:
generate a stream of a content for live distribution;
acquire fragmented text information so as to continue display of first text information including a first character string when second text information including a second character string is displayed, the first text information and the second text information corresponding to subtitle data of the content, the second character string being started to be displayed temporally after the first character string is displayed; and
distribute the stream of the content including the subtitle data, the first text information being distributed at a first timing, and the second text information being distributed at a second timing after the first timing, wherein
the text information includes a structured document that describes the content, and a display definition document that defines a display format which is applied to the structured document,
the first text information distributed at the first timing includes a first structured document that describes the first character string and a time indicating start of display of the first character string, and the first text information does not include a time indicating end of display of the first character string,
the second text information distributed at the second timing after the first timing includes a second structured document that describes the second character string, the time indicating end of display of the first character string, and a time indicating start of display of the second character string, and
the first text information and the second text information are to be used by a receiving device receiving the first text information and the second text information such that the receiving device starts display of the first character string at the time indicating the start of display of the first character string described in the first structured document received at the first timing, and later ends display of the first character string at the time indicating the end of display of the first character string described in the second structured document received at the second timing after the first timing.

10. A distribution method performed by a distribution device, the distribution method comprising:
generating, using circuitry, a stream of a content for live distribution;
acquiring fragmented text information so as to continue display of first text information including a first character string when second text information including a second character string is displayed, the first text information and the second text information corresponding to subtitle data of the content, the second character string being started to be displayed temporally after the first character string is displayed; and
distributing the stream of the content including the subtitle data, the first text information being distributed at a first timing, and the second text information being distributed at a second timing after the first timing, wherein
the text information includes a structured document that describes the content, and a display definition document that defines a display format which is applied to the structured document,
the first text information distributed at the first timing includes a first structured document that describes the first character string and a time indicating start of display of the first character string, and the first text information does not include a time indicating end of display of the first character string,
the second text information distributed at the second timing after the first timing includes a second structured document that describes the second character string, the time indicating end of display of the first character string, and a time indicating start of display of the second character string, and
the first text information and the second text information are to be used by a receiving device receiving the first text information and the second text information such that the receiving device starts display of the first character string at the time indicating the start of display of the first character string described in the first structured document received at the first timing, and later ends display of the first character string at the time indicating the end of display of the first character string described in the second structured document received at the second timing after the first timing.

11. A non-transitory computer-readable storage medium storing computer-readable instructions thereon, which, when executed by a computer, cause the computer to perform a method comprising:
generating a stream of a content for live distribution;
acquiring fragmented text information so as to continue display of first text information including a first character string when second text information including a second character string is displayed, the first text information and the second text information corresponding to subtitle data of the content, the second character string being started to be displayed temporally after the first character string is displayed; and
distributing the stream of the content including the subtitle data, the first text information being distributed at a first timing, and the second text information being distributed at a second timing after the first timing, wherein
the text information includes a structured document that describes the content, and a display definition document that defines a display format which is applied to the structured document,
the first text information distributed at the first timing includes a first structured document that describes the first character string and a time indicating start of display of the first character string, and the first text information does not include a time indicating end of display of the first character string,
the second text information distributed at the second timing after the first timing includes a second structured document that describes the second character string, the time indicating end of display of the first character string, and a time indicating start of display of the second character string, and
the first text information and the second text information are to be used by a receiving device receiving the first text information and the second text information such that the receiving device starts display of the first character string at the time indicating the start of display of the first character string described in the first structured document received at the first timing, and later ends display of the first character string at the time indicating the end of display of the first character string described in the second structured document received at the second timing after the first timing.

12. A distribution system comprising:
a distribution device; and
a receiving device,
wherein the distribution device includes
circuitry configured to:
generate a stream of a content for live distribution,
acquire fragmented text information so as to continue display of first text information including a first character string when second text information including a second character string is displayed, the first text information and the second text information corresponding to subtitle data of the content, the second character string being started to be displayed temporally after the first character string is displayed, and
distribute the stream of the content including the subtitle data, the first text information being distributed at a first timing, and the second text information being distributed at a second timing after the first timing,
the text information includes a structured document that describes the content, and a display definition document that defines a display format which is applied to the structured document,
the first text information distributed at the first timing includes a first structured document that describes the first character string and a time indicating start of display of the first character string, and the first text information does not include a time indicating end of display of the first character string,
the second text information distributed at the second timing after the first timing includes a second structured document that describes the second character string, the time indicating end of display of the first character string, and a time indicating start of display of the second character string, and
wherein the receiving device includes
circuitry configured to:
receive the stream of the content,
analyze the fragmented text information corresponding to the subtitle data included in the received stream, and
control display of the first character string included in the first text information received at the first timing so as to continue display of the first character string when the second character string included in the second text information received at the second timing is displayed based on a result of the analysis by starting display of the first character string at the time indicating the start of display of the first character string described in the first structured document received at the first timing, and later ending display of the first character string at the time indicating the end of display of the first character string described in the second structured document received at the second timing after the first timing, based on a result of the analysis.

* * * * *